(12) United States Patent
Crassous

(10) Patent No.: US 12,005,738 B2
(45) Date of Patent: Jun. 11, 2024

(54) WHEEL DISC AND PRODUCTION MACHINE

(71) Applicant: H-PREC, Carros (FR)

(72) Inventor: Dominique Crassous, Nice (FR)

(73) Assignee: H-PREC, Carros (FR)

( * ) Notice: Subject to any disclaimer, the term of this patent is extended or adjusted under 35 U.S.C. 154(b) by 622 days.

(21) Appl. No.: 17/262,906

(22) PCT Filed: Jul. 24, 2019

(86) PCT No.: PCT/EP2019/069931
§ 371 (c)(1),
(2) Date: Jan. 25, 2021

(87) PCT Pub. No.: WO2020/020952
PCT Pub. Date: Jan. 30, 2020

(65) Prior Publication Data
US 2021/0252907 A1    Aug. 19, 2021

(30) Foreign Application Priority Data

Jul. 26, 2018  (FR) ...................................... 1856992

(51) Int. Cl.
*B60B 5/02*       (2006.01)
*B29C 70/34*      (2006.01)
(Continued)

(52) U.S. Cl.
CPC .............. *B60B 5/02* (2013.01); *B29C 70/345* (2013.01); *B29C 70/38* (2013.01); *B60B 1/0223* (2013.01);
(Continued)

(58) Field of Classification Search
CPC .......... B60B 5/02; B60B 1/0223; B60B 21/02
See application file for complete search history.

(56) References Cited

U.S. PATENT DOCUMENTS

| 9,662,932 B2* | 5/2017 | Dingle ...................... B60B 1/14 |
| 2008/0054715 A1* | 3/2008 | Meggiolan ............ B60B 27/023 |
| | | 301/110.5 |

(Continued)

FOREIGN PATENT DOCUMENTS

| DE | 102009050458 A1 | 4/2011 |
| EP | 0525253 A1 | 2/1993 |

(Continued)

OTHER PUBLICATIONS

International Search Report and Written Opinion from corresponding International Application No. PCT/EP2019/069931, dated Oct. 18, 2019, pp. 1-12, European Patent Office, Rijswijk, The Netherlands.

*Primary Examiner* — Scott A Browne
(74) *Attorney, Agent, or Firm* — HAUPTMAN HAM, LLP

(57) ABSTRACT

One or more embodiments relate to a device configured to form at least partially at least one disc of a wheel having a rim and a hub support defining an axis of rotation, wherein the device has at least: one central zone; one peripheral zone partially surrounding the central zone; one first portion having at least one first layer and extending into the peripheral zone and into the central zone along a first axis; one second portion having at least one second layer and extending into the peripheral zone and into the central zone along a second axis different from the first axis; and in that the first portion and the second portion are superposed relative to one another at the level of the central zone defining a stack.

5 Claims, 17 Drawing Sheets

(51) Int. Cl.
    *B29C 70/38*     (2006.01)
    *B60B 1/02*     (2006.01)
    *B60B 21/02*     (2006.01)
    *B29K 105/08*     (2006.01)
    *B29K 307/04*     (2006.01)
    *B29K 309/08*     (2006.01)
    *B29L 31/32*     (2006.01)

(52) U.S. Cl.
    CPC ...... *B60B 21/02* (2013.01); *B29K 2105/0845* (2013.01); *B29K 2307/04* (2013.01); *B29K 2309/08* (2013.01); *B29L 2031/32* (2013.01); *B60B 2310/206* (2013.01); *B60B 2310/226* (2013.01); *B60B 2310/242* (2013.01); *B60B 2360/341* (2013.01)

(56) References Cited

U.S. PATENT DOCUMENTS

| | | |
|---|---|---|
| 2011/0084541 A1 | 4/2011 | Lew |
| 2014/0346847 A1 | 11/2014 | Werner et al. |
| 2020/0406672 A1* | 12/2020 | Denmead ................ B60B 21/04 |

FOREIGN PATENT DOCUMENTS

| | | |
|---|---|---|
| EP | 0644041 A1 | 3/1995 |
| WO | 2013083500 A1 | 6/2013 |

\* cited by examiner

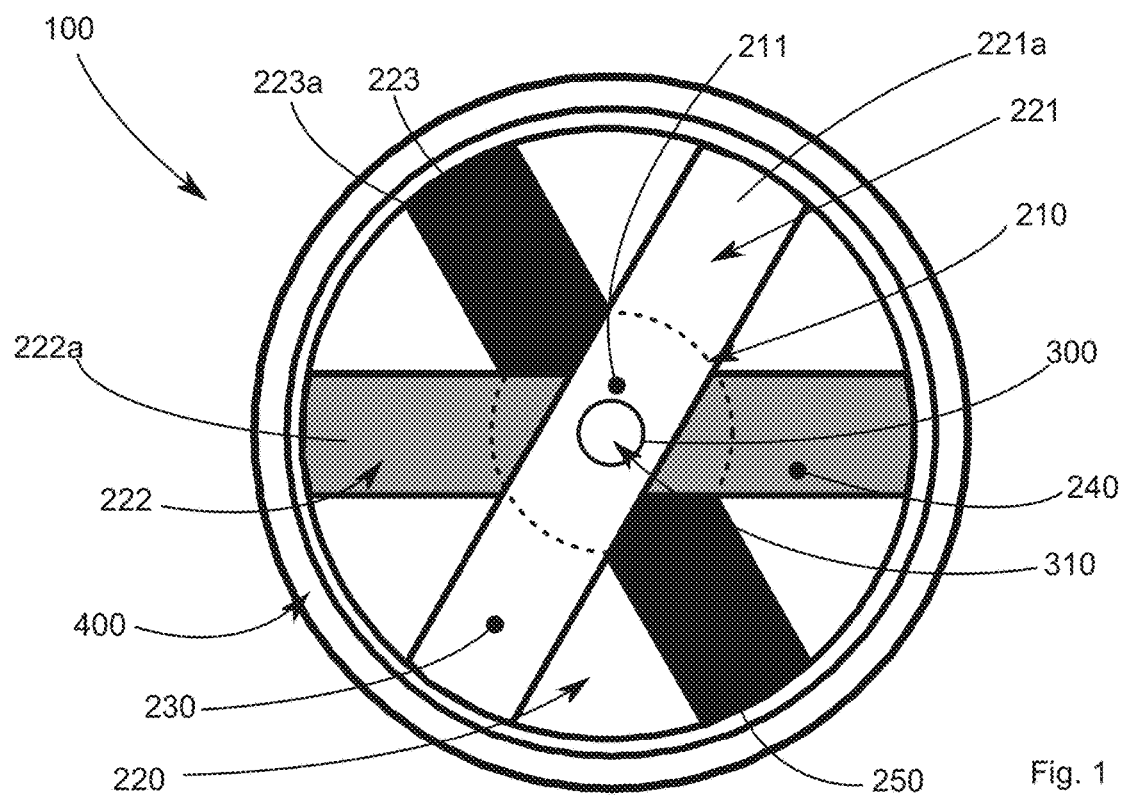
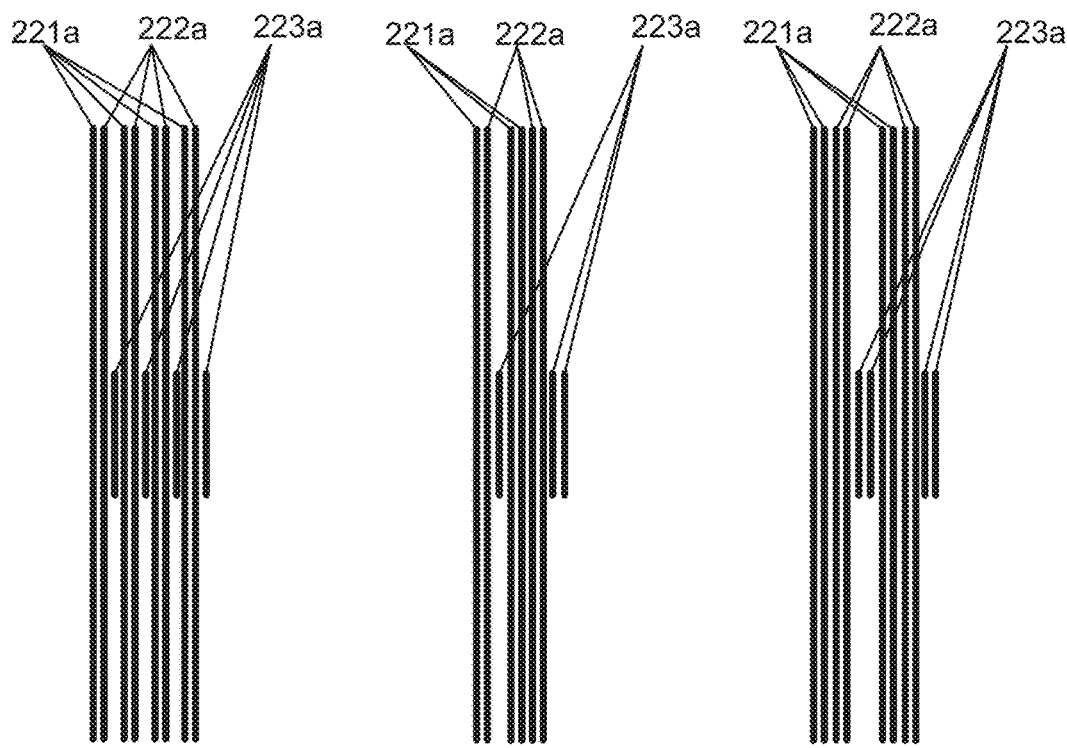
Fig. 2a        Fig. 2b        Fig. 2c

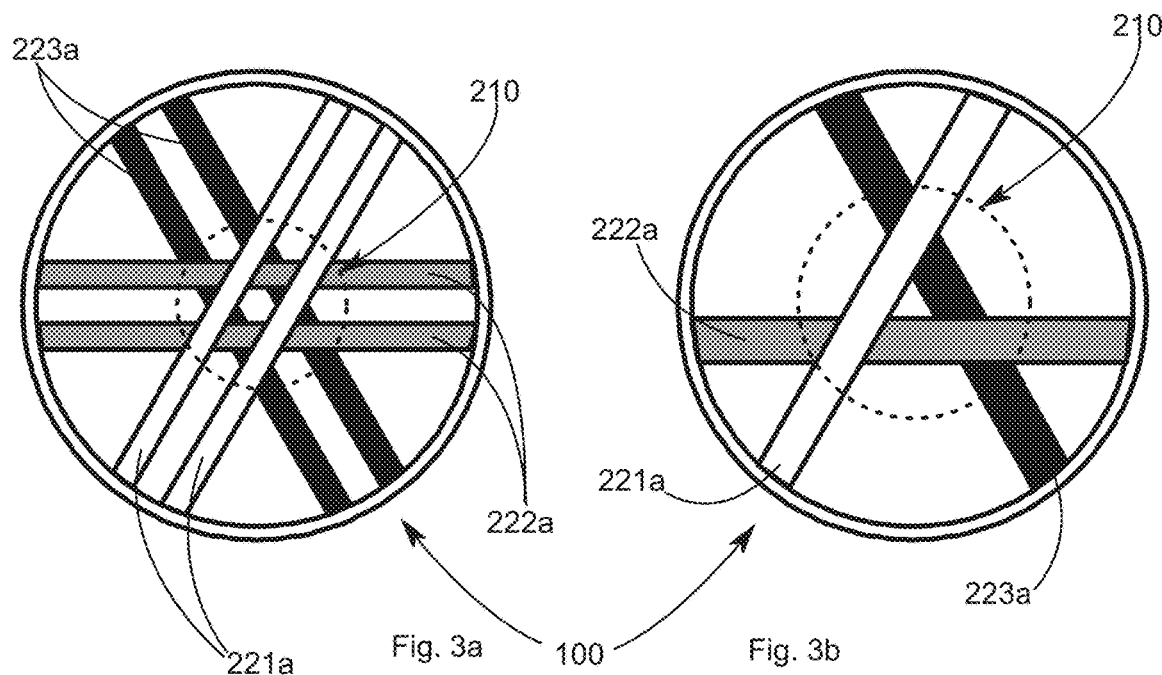
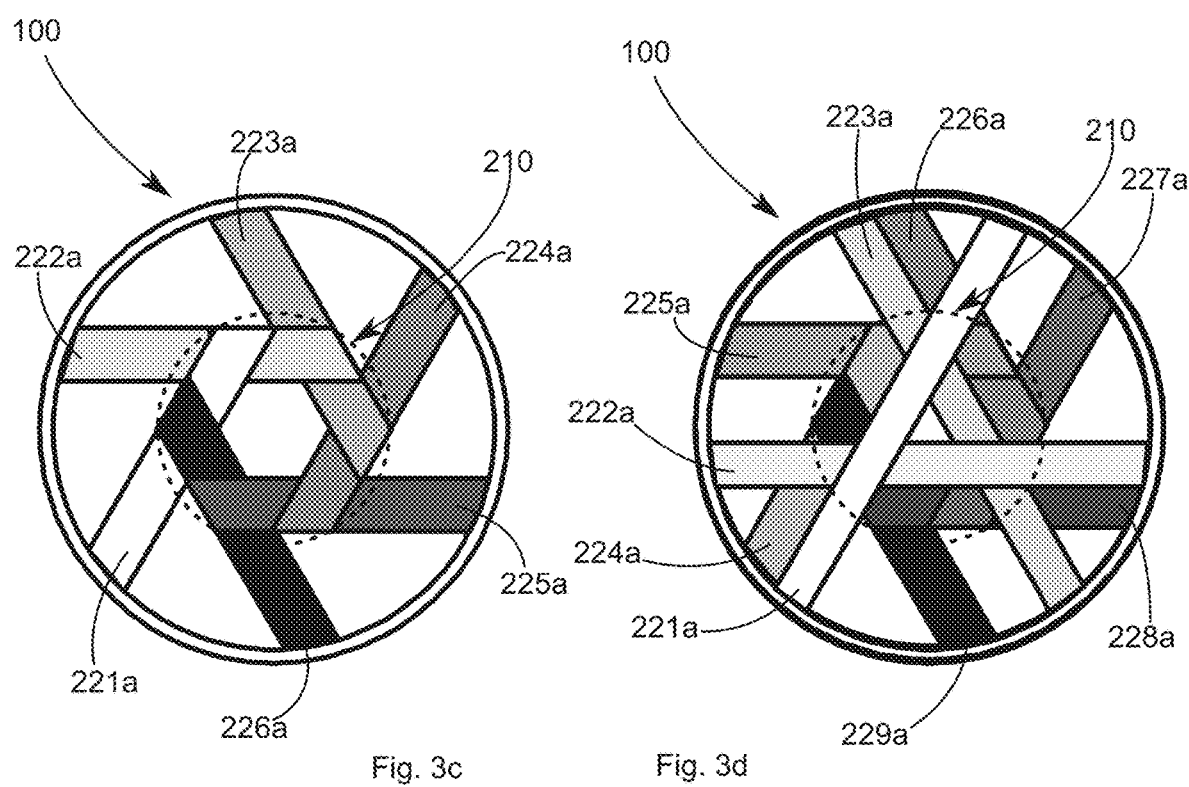

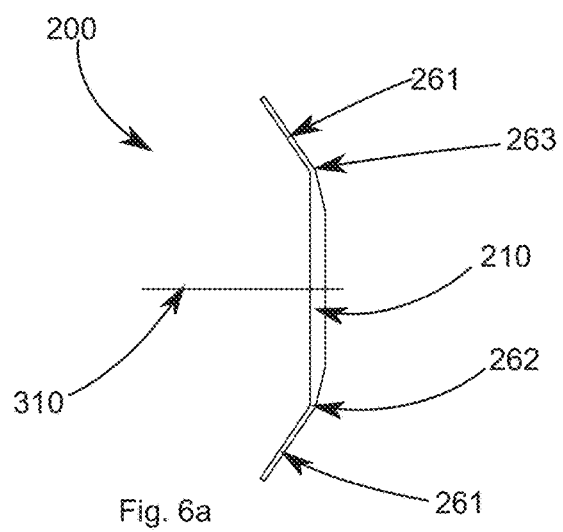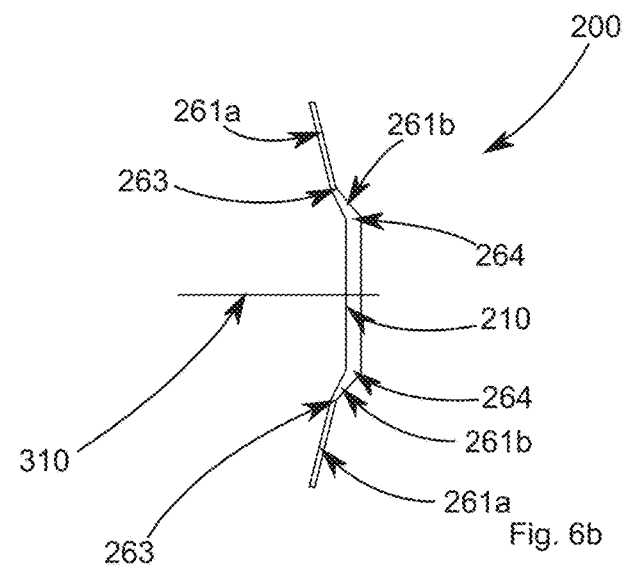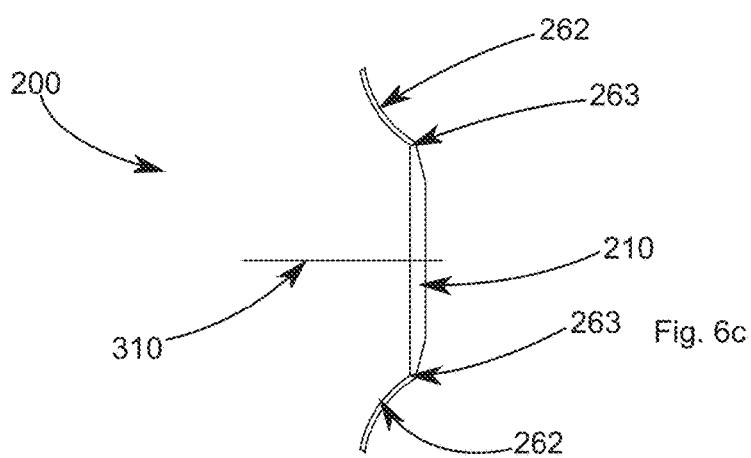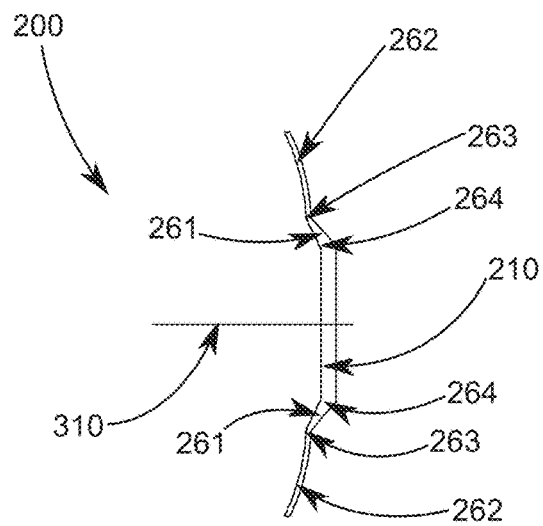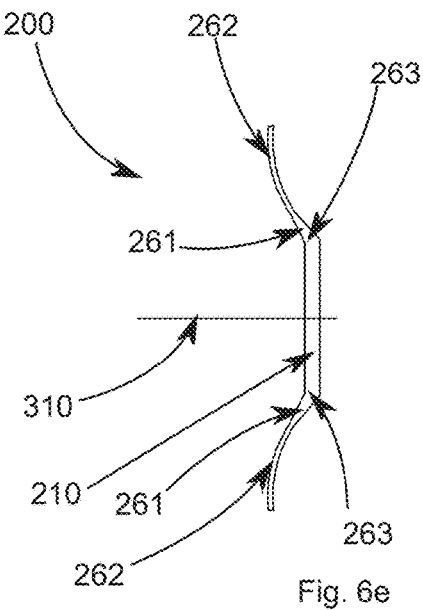

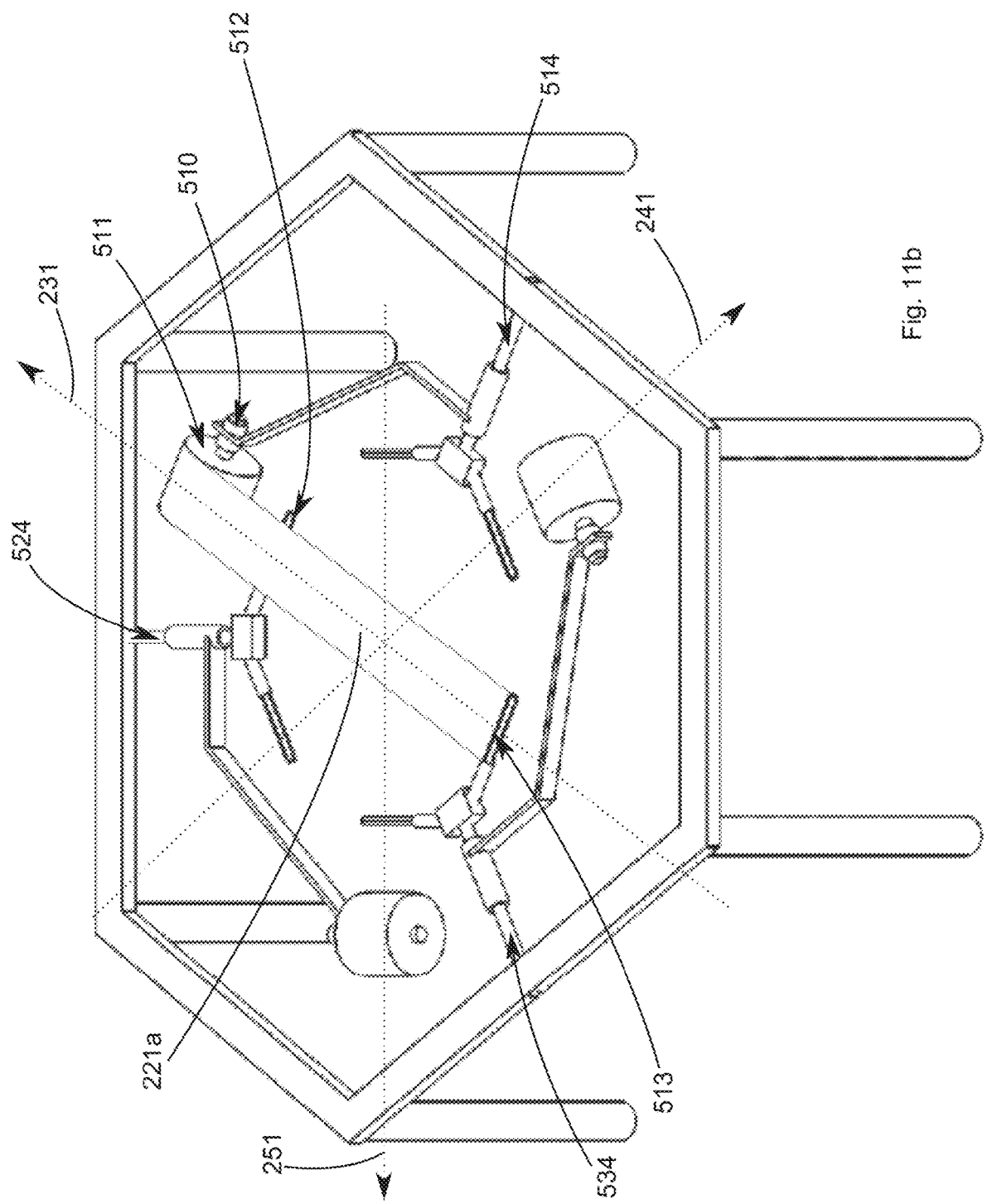

WHEEL DISC AND PRODUCTION MACHINE

The present application is a U.S. National Phase of International Application Number PCT/EP2019/069931, filed Jul. 24, 2019, which claims priority to French Application No. 1856992, filed Jul. 26, 2018.

TECHNICAL FIELD

The present invention relates to the field of wheels in general, and more specifically vehicle wheels comprising composite materials.

PRIOR ART

For thousands of years, wheels have been made with different materials and different constructions. Wheels have thus been one-piece, made of stone, but also more recently, made of aluminium. They have also been assembled, made of wood then made of steel in large-series cars from the start of the last century to today. Over periods of time, certain constructions have been marked by a significant difference between the material used, the features thereof, and the construction method. One-piece stone wheels have been replaced by wooden wheels, then light and easier-to-manufacture wheels, but of which the material was not very suitable for the solid design of the stone wheel that they however return. Wooden wheels have then adopted the wheel design with spokes perfectly suitable for the material.

Later, the first cast aluminium rims have been manufactured with designs close to those of stamped sheet metal rims, then have developed towards the current designs which are a lot more logical with this material. This reminder of history and these few examples selected from among tens of others, reveal a difficulty in adapting wheels to new materials and allows to understand the limits of certain solutions, as well as the interest in innovations which can be proposed to improve this product.

A wheel consists of three portions, each having a particular function for each of the specific stresses. The three portions are the hub support, this being included or not in the wheel, the disc connecting the hub support to the rim supporting the tyre and ensuring, if needed, the sealing, in case of absence of an air chamber.

The rim itself consists of the flange supporting the tyre over the inner diameter thereof, of the edge holding the tyre in the axial direction and of the base connecting the two flanges together. The mechanical forces on these different portions are very different and would assume different materials and designs, but difficult to mix and assemble in mainstream products.

For years, the aluminium wheel has gripped the top of the pavement and equipped most vehicles. It has particularly been appreciated for the aesthetic qualities thereof and the manufacturing facility thereof relative to a reasonable cost. However, the continuous search for performances, linked to more and more restrictive environmental regulations, has led manufacturers to consider ultra-light wheels.

This accessory indeed has a feature which is a very significant gyroscopic effect which means that the weight thereof damages the performances in a very significant manner, due to a weight that is difficult to compress and due to a significant diameter.

For example, wheels of which the metal disc is mechanically integral with composite material connecting elements is known from document U.S. Pat. No. 7,918,513B2, this in order to reduce the weight of the wheel.

Document US 2011/084541 A1 discloses a bicycle wheel which has a central hub zone and a plurality of spokes. The spokes can be made of composite materials and are connected to the hub in different places of the latter.

However, these solutions do not resolve the problems outlined above which relates to the lightening of the wheel, while conserving an acceptable mechanical strength.

The present invention aims to resolve at least some of these problems.

SUMMARY

The present invention relates to a device configured to form at least partially one disc of a wheel comprising a rim and at least one support of at least one hub defining an axis of rotation, the device being characterised in that it comprises at least:
  one central zone;
  one peripheral zone partially surrounding the central zone;
  one first portion comprising at least one first layer of at least one first composite material formed by a first fibre bundle, preferably one-directional, in an array and extending into the peripheral zone and into the central zone along a first axis of extension of the fibres of the first one-directional bundle;
  one second portion comprising at least one second layer of at least one second composite material formed by a second fibre bundle, preferably one-directional, in an array and extending into the peripheral zone and into the central zone along a second axis of extension, the second axis of extension being different from the first axis of extension;
  and in that the first portion and the second portion are superposed relative to one another at the level of the central zone defining a multidirectional stack of bundles, preferably one-directional.

Advantageously, a multidirectional stack of one-directional bundles is thus defined within which portions of the first layer and portions of the second layer are superposed alternately.

The present invention thus allows the at least partial formation of a wheel disc by using composite materials comprising very advantageously, one-directional fibres forming at least one one-directional bundle. The fibres are disposed in the direction of the spokes of the wheel to benefit to the maximum, traction properties of the material used.

Thus, a wheel portion is formed, differentiating the mechanical performance of a central zone, for example at the level of a hub, and of a peripheral zone, for example comprising spokes, it all without structural discontinuity between the two zones, since they come from same layers of composite material. The effectiveness of mechanical resistance applied to the weight is thus optimal.

Thus, the main direction of extension of the one-directional fibres is colinear to the direction of the spokes of the wheel.

In other words, the one-directional fibres extend along an axis of extension extending into the central zone and into the peripheral zone of the device.

This particular arrangement of the one-directional fibres allows, on the one hand, to obtain at the level of the spokes of the wheel, a peripheral structure having a high mechanical resistance relative to the traction forces, forces being exerted, in particular at the level of the spokes of a wheel; on the other hand, this allows, by superposition of the one-directional fibres, at the level of the central zone of the device to obtain a central structure having a high mechanical resistance relative to any type of forces, that this is traction or tension force at the level of the central zone of the device, and therefore preferably at the level of the hub support of the wheel.

The present invention thus allows to partially produce at least one wheel disc having a reduced weight, a low cost and an increased mechanical resistance.

By cleverly disposing the one-directional fibre bundle, the present invention allows to partially obtain at least one reliable wheel disc, mechanically resistant, light and inexpensive.

Particularly advantageously, the present invention uses the anisotropy of a composite material to partially manufacture at least one-piece discs of which different zones have different mechanical properties according to the distribution and to the nature of said composite material.

The present invention therefore allows to create a wheel with spokes through an arrangement of the fibres in the portion of the disc. The wheel comprising this disc includes less parts that a wheel with metal spokes does not require maintenance and it is possible to manufacture this disc with few operations with few parts and an assembly, if necessary, easy with the remainder of the wheel.

The present invention allows to achieve a central zone of mechanical resistance equivalent to aluminium solutions, but with a low weight.

The present invention is designed such that the peripheral zone, i.e. that comprising the spokes of the wheel, is lighter than the central zone. Indeed, the peripheral zone corresponds to the zone wherein the stresses are mainly returned in traction.

The central zone is cleverly configured to be heavier and more isotropic than the peripheral zone and to resist a lot more varied mechanical stresses according to the forces applied on the wheel. This central zone is disposed close to, or can comprise the hub support of the wheel, for example.

The present invention allows to dispose a wheel disc of which the central zone comprises multiaxial mechanical reinforcements and of which the peripheral zone comprises spokes in one-directional fibres. Thus, cleverly, the weight of the structure is reduced and this is optimised relative to the different mechanical forces supported by the different zones thereof.

Advantageously, the device according to the present invention can be used only for manufacturing the wheel disc or receive additional reinforcements.

According to an embodiment, woven reinforcements can be integrated to the present invention in order to increase the mechanical resistance thereof.

Advantageously, the device according to the present invention can be connected to any type of rim and be connected at any point of the rim by any means, mechanical, by gluing, by welding or by integration of reinforcements of the disc organised in the construction of a wheel or of a composite wheel portion.

The present invention also relates to an assembly of at least one first device according to the present invention and of at least one second device according to the present invention, the first device and the second device being integral with one another at the level of at least one securing zone.

This forms a three-dimensional assembly, and thus allows a better distribution of the mechanical forces between the two devices.

The present invention further relates to a method for manufacturing at least one device according to the present invention comprising at least the following steps:

Positioning of the first layer along the first axis of extension so as to define at least one first spoking axis of the wheel, preferably the first spoking axis of the wheel defining at least one first spoking axis of the wheel;

Positioning of the second layer along the second axis of extension, different from the first axis of extension, so as to define at least one second spoking axis of the wheel different from the first spoking axis of the wheel and so as to superpose at least one portion of the second layer with a portion of the first layer at the level of the central zone, preferably the second spoking axis defining at least one second spoking axis of the wheel.

The present invention finally relates to a machine for implementing the method according to the present invention comprising at least:

one frame comprising a central portion and one peripheral portion and supporting at least:
  one first mobile arm, preferably rotating, extending along a direction orthogonal to the first axis of extension and being intended to carry at least one first coil comprising a winding of the first layer, the winding of the first layer being carried out along an axis orthogonal to the first axis of extension;
  one second mobile arm, preferably rotating, extending along a direction orthogonal to the second axis of extension and being intended to carry at least one second coil comprising a winding of the second layer, the winding of the second layer being carried out along an axis orthogonal to the second axis of extension;

the first mobile arm being configured to unwind the first layer along the first axis of extension in the peripheral portion and in the central portion of the frame;

the second mobile arm being configured to unwind the second layer along the second axis of extension in the peripheral portion and in the central portion of the frame, so as to superpose at least one portion of the second layer with a portion of the first layer at the level of the central portion of the frame.

This allows to manufacture the wheel discs at mass production levels.

BRIEF DESCRIPTION OF THE DRAWINGS

The aims, objectives, as well as the features and advantages of the invention will emerge better from the detailed description of an embodiment of the latter which is illustrated by the following supporting drawings, wherein;

FIG. 1 illustrates a wheel comprising a hub support, a disc and a rim according to the embodiment of the present invention.

FIGS. 2a, 2b and 2c illustrate a profile view of devices according to three embodiments of the present invention illustrating the superposition of the layers.

FIGS. 3a to 3d illustrate different embodiments of the present invention, in particular relative to the arrangement of different layers.

FIGS. 6a to 6e illustrate different embodiments of the present invention, wherein a portion of the device is deformed, for example, by stamping.

FIGS. 11a, 11b and 11c represent a machine for implementing a manufacturing method according to another embodiment of the present invention.

Figure 4:
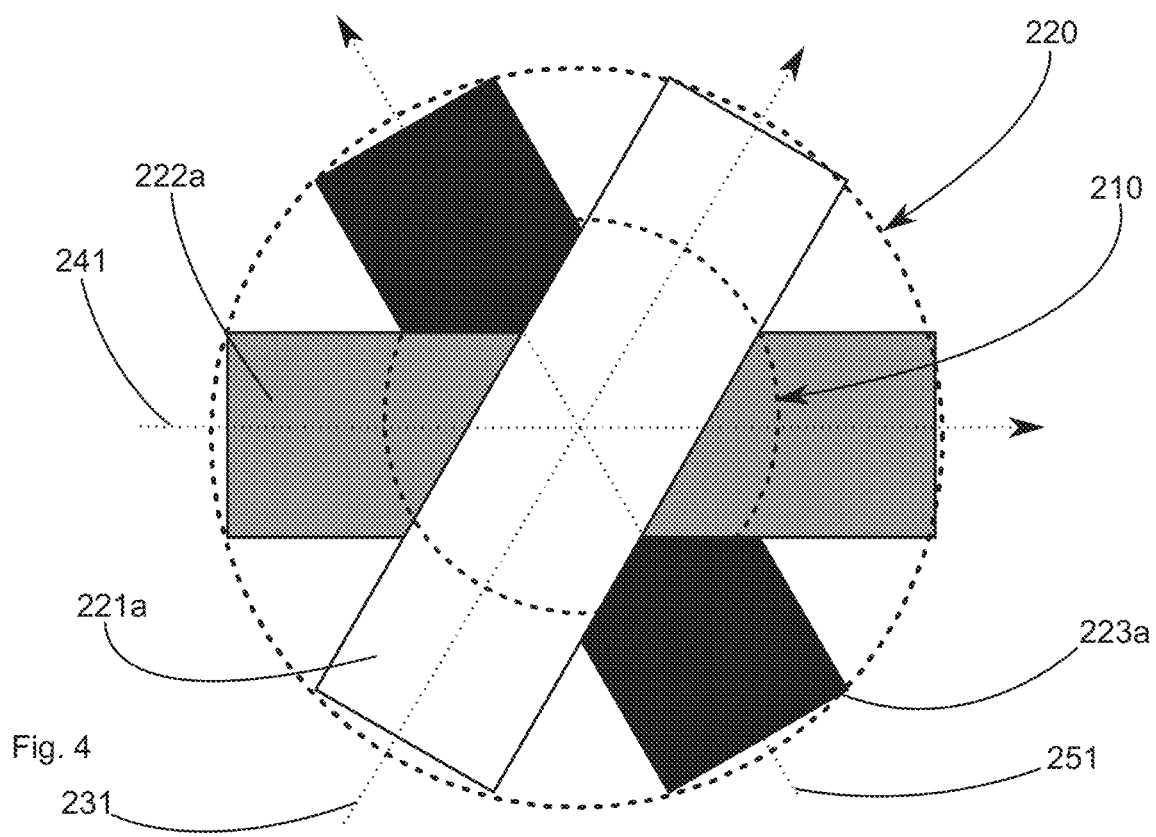
FIG. 4 illustrates an arrangement of three layers, as well as the respective main axes of extension thereof according to an embodiment of the present invention.

The appended drawings are given as examples and are not limiting of the invention. These drawings are schematic representations and are not necessarily to the scale of the practical application.

DETAILED DESCRIPTION

It is specified that in the scope of the present invention, the term "central zone", or its equivalents, have as a definition, a zone comprising the multidirectional stack and preferably the axis of rotation of the wheel, even the hub support which could or not comprise the hub itself.

It is specified that in the scope of the present invention, the term "peripheral zone", or its equivalents, have as a definition, a zone surrounding at least partially the central zone, More geometrically, the peripheral zone is defined by the zone extending from the central zone to the rim. It is the peripheral zone which ensures the mechanical connection between the central zone and the rim.

It is specified that in the scope of the present invention, the term "composite", or its equivalents, is understood as being the mixture in proportions and with a distribution defined of two non-miscible materials, like for example a reinforcement and an array, or also a one-directional fibre bundle and an array.

It is specified that in the scope of the present invention, the term "layer" means an element having a main direction of extension, a secondary direction of extension, orthogonal to the main direction, and a thickness. The spatial dimension of the layer along the main direction of extension thereof corresponds to the length thereof. The spatial dimension of the layer along the secondary dimension of extension thereof corresponds to the length thereof. A layer is defined as having a length greater than the width thereof, and a width greater than the thickness thereof.

A layer can comprise composite material formed by at least one fibre bundle in an array, preferably the fibre bundle being one-directional.

A layer can comprise fibres disposed in at least one array, each fibre having a main geometric dimension, this main geometric direction being preferably, but in a non-limiting manner, oriented along the main direction of extension of the layer, i.e. preferably along the length thereof.

It is specified that in the scope of the present invention, the terms "spoking axis", "spoke", or the equivalents thereof have, as a definition, a mechanical element extending from the rim to the central zone. A spoking axis is defined as a layer or fabric portion extending into the peripheral zone between the central zone and the rim. Advantageously, the longitudinal dimension of the layer is directed along the length of the spoking axis.

It is specified that in the scope of the present invention, the term "triangulation effect", or the equivalents thereof have, as a definition, a triangular mechanical formation intended to breakdown a force vector into a plurality of force vectors of lesser intensity. In particular, a triangulation effect consists of distributing over two sides of a triangle, a mechanical force applied to the common peak at these two sides.

It is specified that in the scope of the present invention, the term "superposition on itself" or "folding on itself" or the equivalents thereof have, as a definition, a superposition of a layer with itself, i.e. a first portion of a layer with a second portion of this same layer without involving said layer being in contact with itself following this superposition and without necessarily involving a continuity of material between the first layer portion superposed to the second portion of the same layer, advantageously, this also includes the case where the layer is split into two portions, one being superposed to the other.

It is specified that in the scope of the present invention, the terms "above", "on", "surmounts", "covers" or "underlying" or the equivalents thereof, do not mean "in contact with". For example, a first layer disposed above a second layer does not compulsorily mean that the Iwo layers are directly in contact with one another, but this means that the first layer covers at least partially the second layer by being either directly in contact with it, or by being separated from it by at least one other layer or at least one other element.

Except for specific indication on the contrary, of the technical features described in detail for a given embodiment can be combined with the technical features described in the context of other embodiments described as a non-limiting example.

In the following description, similar reference numbers will be used to describe similar designs through different embodiments of the invention.

Before starting a detailed review of embodiments of the invention, optional features are stated below which can possibly be used in association or alternatively:

Advantageously, at least some of the fibres of the first one-directional bundle are, at least partially, impregnated with at least one thermosetting and/or thermoplastic resin, and/or wherein at least some of the fibres of the second one-directional bundle are, at least partially, impregnated with at least one thermosetting and/or thermoplastic resin.

Advantageously, the fibres can be pre-impregnated or impregnated during the manufacturing process.

Advantageously, at least some of the fibres of the first one-directional bundle comprises at least one of the materials taken from among: metal, glass, carbon, aramid, boron, titanium, and more generally, any material constituting a reinforcement that it is possible to submerge in an array while respecting a distribution and suitable proportions to obtain an optimised composite material and/or at least some of the fibres of the second one-directional bundle comprises at least one of the materials taken from among: metal, glass, aramid, carbon, boron, titanium, and more generally, any material constituting a reinforcement that it is possible to submerge in an array while respecting a distribution and suitable proportions to obtain an optimised composite material.

This allows to dispose fibres having a very good ratio between the mechanical properties in traction thereof and the weight thereof.

This allows to manufacture spoking axes of light and mechanically resistant wheels.

Advantageously, the central zone has a greater weight than the peripheral zone.

Advantageously, the central zone has a construction and mechanical properties different from the peripheral zone.

Advantageously, the first portion and the second portion are formed by alternating first and second layers which are superposed relative to one another according to a predetermined order, also called pace.

Advantageously, the multidirectional stack comprises an ordered stack according to the predetermined order of a portion of the first layer and a portion of the second layer.

Advantageously, the central zone comprises the hub support.

Advantageously, the central zone comprises the wheel hub.

Advantageously, the hub support comprises the wheel hub.

Advantageously, the first layer and the second layer are disposed at the level of the central outlet zone to define a placement of the hub support of the wheel.

Advantageously, the device comprises at least one additional structural reinforcement, preferably in the form of a woven reinforcement, for example one-directional or multidirectional, or a multiaxial reinforcement, introduced between at least the first layer and the second layer, preferably at the level of the central zone and/or of the zone allowing to form the junction with the rim and/or the constitution of a portion of the rim linked to the wheel disc.

Advantageously, at least one portion of the first layer partially forms at least one first spoking axis of the wheel extending mainly along the first axis of extension.

Advantageously, at least one portion of the second layer partially forms at least one second spoking axis of the wheel extending mainly along the second axis of extension.

Advantageously, the peripheral zone mechanically connects the rim of the wheel to the central zone.

Advantageously, the first spoking axis and the second spoking axis mechanically connect the rim of the wheel to the central zone.

Advantageously, the first axis of extension and the second axis of extension are both orthogonal relative to the axis of rotation of the wheel.

Advantageously, the multidirectional stack comprises at least one multidirectional reinforcement disposed between at least the first layer and the second layer, preferably, the multidirectional reinforcement being prestressed.

Advantageously, the peripheral zone comprises at least one peripheral portion configured to form at least partially one portion of the rim.

Advantageously, said portion of the rim formed by the peripheral portion comprises at least one from among: a portion of the bottom of the rim, a portion of at least one flange of the rim, a portion of at least one edge of the rim.

Advantageously, the peripheral zone comprises at least one peripheral portion configured to form at least partially one portion of the rim comprising at least one from among: a portion of the bottom of the rim, a portion of at least one flange of the rim, a portion of at least one edge of the rim.

Advantageously, at least one portion of the first and/or of the second layer at the level of the peripheral zone is inclined and/or curved relative to a plane comprising the first and the second axis of extension.

This allows to modify the mechanical properties of the wheel as needed and to adjust the rigidity thereof or the flexibility thereof along certain predetermined axes, This allows to increase the mechanical resistance of the wheel.

This allows to ensure an offset of the rim with respect to the hub support of the wheel while conserving a freedom of form of the spoking axes of the wheel with the aim of optimising the rigidity of the wheel.

This allows to control the flexibility of the wheel and to adjust it to the operating stresses.

Advantageously, at least one portion of the first spoking axis and/or of the second spoking axis at the level of the peripheral zone is inclined and/or curved relative to a plane comprising the first and the second axis of extension.

This allows to modify the mechanical properties of the wheel as needed and to adjust the rigidity thereof or the flexibility thereof along certain predetermined axes.

This allows to increase the mechanical resistance of the wheel.

This allows to ensure an offset of the rim with respect to the hub support of the wheel while conserving a freedom of form of the spoking axes of the wheel, with the aim of optimising the rigidity of the wheel.

This allows to control the flexibility of the wheel and to adjust it to the operating stresses.

Advantageously, the device according to the present invention comprises at least one third portion comprising at least one third layer of at least one third composite material formed by a third one-directional fibre bundle in an array and extending into the peripheral zone and into the central zone along a third axis of extension, the third axis of extension being different from the first axis of extension and of the second axis of extension, the first portion, the second portion and the third portion being superposed relative to one another at the level of the central zone.

Advantageously, the securing zone is taken from among at least: one portion of the central zone of the first and/or second device, one portion of the peripheral zone of the first and/or second device, one portion of the first portion of the first and/or second device, one portion of the second portion of the first and/or second device.

Advantageously, the peripheral zone of the first device and the peripheral zone of the second device are disposed parallel relative to one another.

Advantageously, the securing zone comprises a securing element.

Advantageously, the securing element comprises an axis disposed at the level of the axis of rotation of the wheel.

Advantageously, the first device and the second device are kept integral with one another by at least one securing element.

Advantageously, the securing element comprises a spacer disposed at the level of the axis of rotation of the wheel.

Advantageously, the securing element comprises a first part and a second part disposed at the level of the axis of rotation of the wheel respectively on either side of the wheel.

Advantageously, the securing element comprises a spacer disposed between the first device and the second device.

Advantageously, the securing element comprises a spacer disposed between the first device and the second device, and a first part and a second part disposed at the level of the axis of rotation of the wheel respectively on either side of the wheel, preferably forming a hub support and/or comprising the hub.

Advantageously, the securing element comprises the rim of the wheel.

According to an embodiment, the central zone of the first device and the central zone of the second device can have a relative space less than the space presented by the peripheral zone of the first device relative to the peripheral zone of the second device.

According to another embodiment, the central zone of the first device and the central zone of the second device can have a relative space greater than the space presented by the peripheral zone of the first device relative to the peripheral zone of the second device.

Also, according to another embodiment, the central zone of the first device and the central zone of the second device can have a relative space equal to the space presented by the peripheral zone of the first device relative to the peripheral zone of the second device.

Advantageously, the first device comprises at least one first portion of the rim of the wheel.

Advantageously, the first device comprises at least one second portion of the rim of the wheel.

Advantageously, the rim of the wheel is formed by the first portion of the rim and by the second portion of the rim.

Advantageously, the method according to the present invention further comprises at least the following steps:
Folding of the first layer on itself by superposing it to the second layer at the level of the central zone and to itself at the level of the peripheral zone;
Folding of the second layer on itself by superposing it to the first layer at the level of the central zone and to itself at the level of the peripheral zone.

Advantageously, the method according to the present invention further comprises at least the following steps:
Folding of the first layer on itself by superposing it to the second layer at the level of the central zone and to itself at the level of the peripheral zone;
Folding of the second layer on itself by superposing it to the first layer at he level of the central zone and to itself at the level of the peripheral zone.

Advantageously, the method according to the present invention further comprises at least the following steps:
Superposition of the first layer on itself by superposing it to the second layer at the level of the central zone and to itself at the level of the peripheral zone;
Superposition of the second layer on itself by superposing it to the first layer at the level of the central zone and to itself at the level of the peripheral zone.

Advantageously, the method according to the present invention comprises at least one step of cutting at least one portion of the first layer at the level of the peripheral zone, so as to form a first plurality of spoking axes of the wheel from the first layer, and/or comprising at least one step of cutting at least one portion of the second layer at the level of the peripheral zone so as to form a second plurality of spoking axes of the wheel from the second layer, Advantageously, the method according to the present invention comprises at least one step of cutting at least one portion of the first layer at the level of the first spoking axis so as to form a first plurality of spoking axes of the wheel from at least one first spoking axis.

Advantageously, the method according to the present invention comprises at least one step of cutting at least one portion of the second layer at the level of the second spoking axis so as to form a second plurality of spoking axes of the wheel from at least the second spoking axis.

Advantageously, the method according to the present invention comprises at least one stamping step, also called shaping step, configured to deform at least one portion of the first and/or the second layer. This step can be manual before passing into a machine, or automatic, for example if the draping is carried out on a shape.

This allows to control the flexibility of the wheel and to adjust it to the operating stresses. This allows to ensure an offset of the rim with respect to the hub support of the wheel while conserving a freedom of form of the spoking axes of the wheel with the aim of optimising the rigidity of the wheel.

Advantageously, the method according to the present invention comprises at least one stamping step comprising at least the deformation of a portion of the first and/or of the second layer at the level of the peripheral zone so as to incline at least one from among the first spoking axis and the second spoking axis relative to a plane comprising the first and the second axis of extension.

Advantageously, the method according to the present invention comprises at least one shaping step in the axial direction comprising at least the deformation of a portion of the first and/or of the second layer at the level of the peripheral zone so as to incline at least one from among the first spoking axis and the second spoking axis relative to a plane comprising the first and the second axis of extension.

Advantageously, the method according to the present invention comprises at least one step of forming at least one portion of the rim of the wheel by winding at least one additional layer around the peripheral zone relative to the axis of rotation of the wheel.

Advantageously, the frame further supports at least:
one first fixed arm extending along a direction parallel to the first mobile arm;
one first abutment arm extending along a direction parallel to the first mobile arm, the first fixed arm and the first abutment arm being disposed on either side of the central portion;
one second fixed arm extending along a direction parallel to the second mobile arm;
one second abutment arm extending along a direction parallel to the second mobile arm, the second fixed arm and the second abutment arm being disposed on either side of the central portion;

the first mobile arm being configured to unwind the first layer along the first axis of extension from the first fixed arm to the first abutment arm;

the second mobile arm being configured to unwind the second layer along the second axis of extension from the second fixed arm to the second abutment arm.

Advantageously, the first mobile arm is further configured to unwind the first layer along the first axis of extension from the first abutment arm to the first fixed arm so as to superpose at least one portion of the first layer with a portion of the second layer at the level of the central portion of the frame, and/or wherein the second mobile arm is configured to unwind the second layer along the second axis of extension from the second abutment arm to the second fixed arm so as to superpose at least one portion of the second layer with a portion of the first layer at the level of the central portion of the frame.

Advantageously, the frame further comprises at least:

One first part for supporting the first mobile arm extending preferably along an axis of extension orthogonal to the first axis of extension;

One second part for supporting the second mobile arm extending preferably along an axis of extension orthogonal to the second axis of extension.

The present invention has as a preferable field of application, wheels of vehicles, like for example, motorcycles or cars.

The present invention relates to a device capable of forming at least partially a wheel disc from composite materials. Below in this description, the device according to the present invention can equally be called wheel device or disc.

The present invention, as will be described below, cleverly uses the anisotropy of the composite materials to reduce the weight of the wheel while maintaining a mechanical resistance at least identical to that of a metal wheel.

By cleverly choosing and by cleverly disposing one-directional bundles of one-directional fibres set in an array, the present invention allows to drastically reduce the weight of a wheel while conserving a mechanical resistance to the different mechanical forces that a sufficient wheel can undergo.

During the development of the present invention, an anisotropy has been observed at the level of the spatial distribution of the mechanical forces supported by a wheel, Thus, the present invention has been developed by considering this anisotropy of forces between, for example, the central zone of a wheel and the peripheral zone thereof. In response to this anisotropy, the present invention has, in an anisotropic manner, mechanical support structures particularly adapted for the type of forces considered.

Thus, the peripheral zone, subjected to traction forces, advantageously comprises, one-directional fibre bundles, of which the main direction of extension is colinear to the traction force undergone in this zone.

Similarly, the central zone undergoing numerous anisotropic forces, this results in a substantially isotropic force, thus, it is by stacking one-directional fibre bundles, that the present invention allows to support these forces at the level of the central zone.

Advantageously, and as described below, the device according to the present invention allows to form a portion or all of a disc which could be connected to any type of rim and be connected at any point of the rim by any means, mechanical, by gluing, by welding or by integrating reinforcements to said disc or be extended to constitute a portion of the rim.

According to an embodiment, the device according to the present invention allow to form a portion or all of a disc which could be extended to constitute at least one portion of the rim, even at of the rim.

According to an embodiment, the device according to the present invention can be used as a functioning whole to constitute a wheel disc or be included in a wheel disc construction as an element providing mechanical qualities specific to an assembly wherein other elements contribute to obtaining all the desired qualities in the final disc.

In order to achieve this result, the present invention also relates to a manufacturing method and a machine for implementing such a method. In particular, this machine, described below, allows to reach the mass production speeds in order to respond to an industrial application of the present invention.

Finally, according to an aspect of the present invention described below, an assembly of two discs can be considered to form a final wheel disc benefiting, from the mechanical features of each device, i.e. of each disc, composing it.

Now, the present invention will be described according to various embodiments through different figures. A description of the device according to the present invention will be started with, configured to partially form at least one wheel disc, then by a description of the method for manufacturing said device, followed by the description of the machine for implementing said method. It will be ended by a presentation of parameters which could, as a non-limiting example, be used for the implementation of the present invention.

Device According to the Present Invention

FIG. 1 represents a profile view of a wheel 100 comprising a disc 200 according to an embodiment of the present invention carrying a hub support 300 and a rim 400.

In this figure, the disc 200 has a central zone 210 and a peripheral zone 220. In addition, the disc 200 comprises six spoking axes 230, 240 and 250 formed from three layers 221a, 222a, 223a of composite materials.

According to an embodiment, each layer from among the first 221a, the second 222a and the third 223a extends into the peripheral zone 220 and in the central zone 210, preferably each defining a diameter of the wheel, and for example the six spoking axes 230, 240 and 250 of the wheel 100 of FIG. 1.

It is noted in this figure, that the first layer 221a is disposed above the second 222a and the third 223a layers. Likewise, the second layer 222a is disposed above the third layer 223a. Indeed, advantageously, and according to a preferred embodiment, the layers 221a, 222a, 223a are disposed such that a portion of each of them at least are superposed to the others at the level of the central zone 210, thus forming there a multidirectional stack 211.

The first and second portions, and possibly the third portion(s), are therefore entangled.

According to an embodiment described below, the layers 221a, 222a, 223a can be folded on itself by circumventing the other layers 221a, 222a, 223a so as to form a loop and to define one same diameter on at least two levels.

Thus, the first layer 221a forms two first spoking axes 230 and this potentially on several levels, the same goes for the second 222a and the third layer 223a.

Advantageously, the zone outside of the crossing of the one-directional fibre bundles, i.e. the peripheral zone 220, comprising spoking axes of one-directional fibres connecting the disc 200 to the rim 400 and optimising the return of the force into this zone and advantageously the weight of this zone.

According to another embodiment, the layers 221a, 222a, 223a can be superposed to one another, with for example, the insertion of reinforcement elements between the layers 221a, 222a, 223a.

FIGS. 2a, 2b and 2c represent three embodiments of stacking the first 221a, second 222a and third 223a layer.

It will be noted that these three figures are profile views of a disc according to the present invention.

It will also be noted that the stack sequence, otherwise called rate, can be different between several embodiments.

According to a first embodiment, the layers 221a, 222a, 223a can be folded on itself so as to surround one or more other layers 221a, 222a, 223a.

According to a second embodiment, the layers can each be disposed by successive layers, without requiring folding on itself.

For example, a diameter can be formed by the third layer 223a, then the second layer 222a is disposed, followed by a third additional layer 223a superposed at least partially to the third layer 223a and superposed partially to the second layer 222a. Then, a second additional layer 222a can be superposed at least partially to the second layer 222a and to the third additional layer 223a, and so on, so as to produce a stack of layers 221a. 222a, 223a without folding on itself.

FIGS. 3a, 3b, 3c and 3d represent four embodiments serving as examples to illustrate different positionings and entanglements of layers 221a, 222a, 223a to form the device 200 according to the present invention. The arrangement of the layers 221a, 222a, 223a relative to one another can also be called draping below in the description.

Thus, these four figures represent four separate drapings.

In preceding FIG. 1, the layers 221a, 222a, 223a at pass through the axis of rotation 310 of the wheel 100. In other words, the direction of extension of each layer 221a, 222a, 223a is found to be along an axis orthogonal to the axis of rotation 310 of the wheel 100.

According to an embodiment, the first layer 221a extends along a first axis of extension 231, the second layer 222a along a second axis of extension 241 and the third layer 223a along a third axis of extension 251.

It will be noted that according to the embodiment of FIG. 1, the first 231, second 241 and third 251 axes of extension are arranged so as to define equal angle cross-sections between each axis of extension.

According to another embodiment not represented, the first 231, second 241 and third 251 axes of extension are arranged so as to define at least one unequal angle cross-section relative to at least one other angle cross-section.

FIG. 3a represents an arrangement substantially similar to that of FIG. 1, almost except for that the first layer 221a comprises two separate portions disposed parallel to one another relative to a diameter of the wheel 100 along said first axis of extension 231.

The same goes for the second 222a and third 223a layers according to the respective axes of extension 241 and 251 thereof. This configuration of the layers 221a, 222a, 223a allows to geometrically define the centre of the wheel 100 through which the axis of rotation 310 of this passes. This also allows to arrange a space at the centre of the central zone 210 for the positioning and/or the formation of a hub support 300 of the wheel 100.

FIG. 3b represents a case where the layers 221a, 222a, 223a are disposed so as to circumvent the centre of the wheel 100, They do not intercept the geometric centre of the wheel 100, For example, the layers 221a, 222a, 223a can be disposed so as to be tangent to the centre.

According to this embodiment, the layers 221a, 222a, 223a are disposed so as to each be offset relative to a different diameter.

FIG. 3c represents an embodiment wherein the layers 221a, 222a, 223a, 224a, 225a and 226a do not define any diameter, but are woven relative to one another. Advantageously, each layer is supported by two contiguous layers and also supports these two contiguous layers.

Indeed, according to this embodiment, the layers 221a, 222a, 223a, 224a, 225a and 226a are disposed so as to not traverse relative to the central zone 210.

According to this embodiment, each layer 221a, 222a, 223a, 224a, 225a and 226a is mechanically integral with two contiguous layers.

Through these three figures, it can advantageously be established that each layer is a homothety of the first layer 221a relative to the axis of rotation 310 of the wheel 100.

Preferably, the second layer 222a is disposed along a second axis of extension 241 which is found to be the image of the first axis of extension 231 according to a rotation of 60 degrees about the axis of rotation 310.

And, the third layer 223a is disposed along a third axis of extension 251 which is found to be the image of the first axis of extension 231 according to a rotation of 120 degrees about the axis of rotation 310 of the wheel 100, or of the second axis of extension 241 according to a rotation of 60 degrees about the axis of rotation 310 of the wheel 100.

FIG. 3d represents an outcome embodiment of a combination of these of FIGS. 3b and 3c. Indeed, this figure illustrates a draping which is a combination of two types of draping. Other draping types are possible.

Advantageously, each draping respects a symmetry of positioning relating to the layers in order to better satisfy the revolution symmetry constraint of the wheel 100.

Preferably, the layers are disposed so as to define angular cross-sections equal to one another.

Advantageously, each layer comprises at least one one-directional fibre bundle of which the main dimension of extension is colinear to that of said layer comprising it.

Thus, the device 200 according to the present invention comprises a central zone 210 comprising at least the paced superposition, preferably over one rotation, of one-directional fibre bundles of which the axis of extension rotates perpendicularly to the axis of rotation 310 of the wheel 100. The one-directional fibre bundles pass, or not, through the centre of the device, i.e. for example the hub support 300 if this coincides with the centre of the wheel 100.

Preferably, the one-directional fibre bundles can go from one point to another of the perimeter of the disc 200, passing, or not, through the centre thereof, or go from one point of the perimeter to a concentric circle to the disc 200 inside this at the level of the central zone 210; the only condition being that it crosses at least one other one-directional fibre bundle so as to define the multidirectional stack 211, i.e. a zone of superposing one-directional fibre bundles and therefore layers.

The one-directional fibre bundles in the layers can be disposed such that they are crossed by respecting a pace, while the pace over a certain number of rotations, is respected.

It preferably suits that the arrangement and the geometry of each layer 221a, 222a, 223a are equal to one another to ensure a geometric and mechanical balance at the disc 200 thus formed.

Preferably, the present invention allows to produce a wheel 100 disc 200 made of composite materials with at least one central zone 210 having a multidirectional stack 211 of one-directional fibre bundles, and this on the most mechanically stressed portion of the disc 200.

Likewise, the present invention allows to produce a wheel 100 disc 200 made of composite material with at least one peripheral zone 220 comprising spokes of one-directional fibre bundles which ensure the connection the centre of the disc 200 and the rim 400.

Thus, the wheel 100 disc 200 has a central zone 210 which could comprise the hub support 300 and a peripheral zone 220 comprising the spoking axes and it all forming a monolithic element having mechanical features, identical to or greater than those of an assembled wheel with spokes.

The device 200 according to the present invention can be used by itself to manufacture a composite disc or receive additional reinforcements to arrive at the final composite disc. According to an embodiment, this device 200 also be integrated to a construction mainly consisting of woven reinforcements to improve the features thereof.

Multidirectional or woven reinforcements can be introduced in the pace of the one-directional fibres, preferably always respecting a geometric and mechanical symmetry relative to the axis of rotation 310 of the wheel 100.

It must be noted that according to an embodiment, said multidirectional or woven reinforcements can be pre-stressed.

FIG. 4 represents the superposition of three layers 221, 222a, 223a and the respective axes of extension 231, 241, 251 thereof, according to which they extend mainly. The central zone 210 and the peripheral zone 220 are also noted in this figure.

Figure 5:
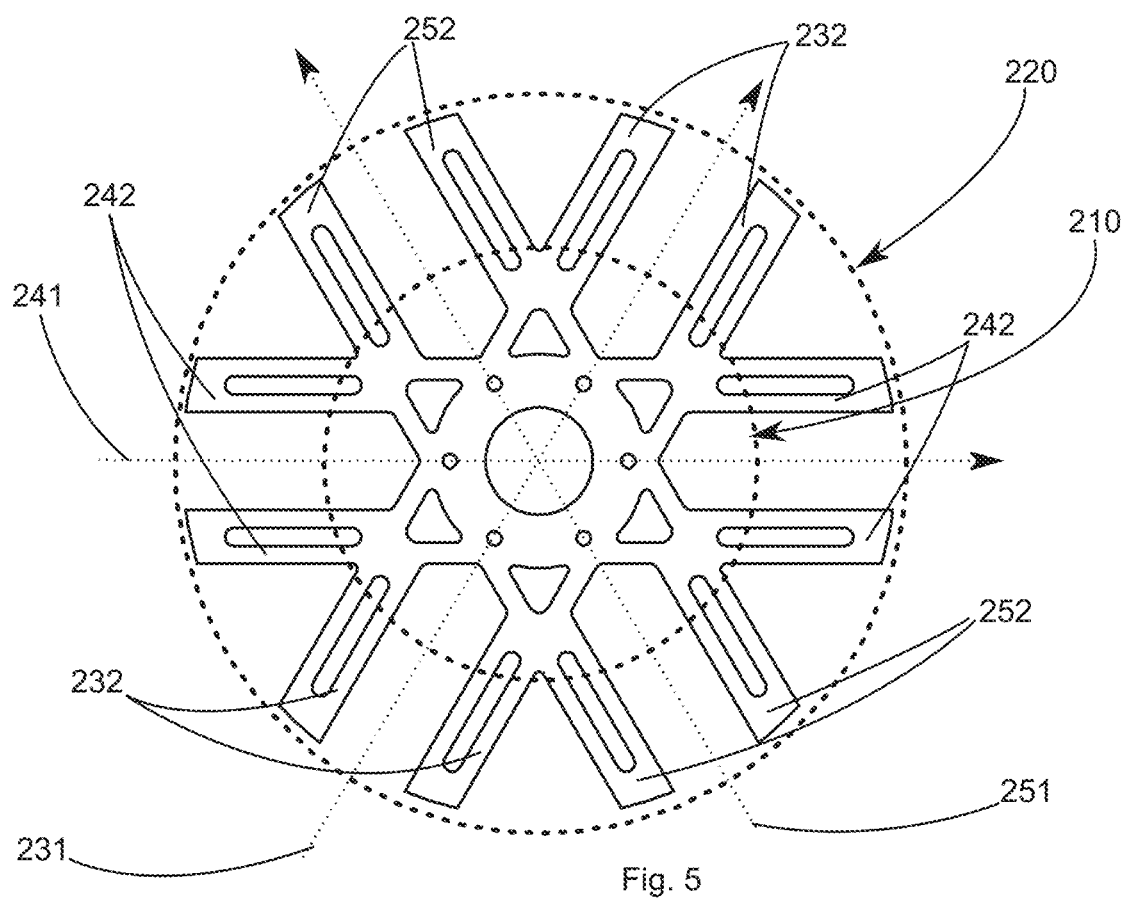
FIG. 5 illustrates a device according to an embodiment of the present invention, wherein a portion of each layer has been removed, for example by cutting, in order to reduce the weight of the device, preferably by optimising the quantity of material per zone.

FIG. 5 represents a device 200 according to an embodiment of the present invention, wherein some of the layers can be removed in order to reduce the weight of the final structure, while conserving the mechanical and geometric properties thereof. The cutting is thus, preferably, done symmetrically relative to the axis of rotation 310 of the wheel 100.

Thus, the wheel 100 disc 200 undergoing a workload all the less significant than it is extended from the centre, it is possible to remove portions of the layers, so-called excessive portions, spoking axis by spoking axis and zone by zone, according to the features that are desired for the disc 200 thus formed. Thus, a disc 200 is obtained, consisting of a central zone 210 with high mechanical resistance structured according to a multidirectional construction interweaved in stages and a peripheral zone 220 comprising spoking axes made of one-directional material mechanically connecting this central zone 210 to the rim 400 of to the part allowing the connection with the rim 400.

According to an embodiment, removing the excess material in the disc 200 can therefore be removed, by any means, like cutting or machining for example, to optimise it zone by zone according to the direction and to the intensity of the force which will be applied to it.

The device 200 thus obtained can be used as is, or associated with other reinforcements or be machined a little, during the removal of material, at least one one-directional fibre bundle is not fully split after the last crossing between the portion of this one-directional fibre bundle connected to the rim 400 and another one-directional fibre bundle of the arrangement of one-directional fibre bundles.

Thus, according to this embodiment, the first spoking axis 230 leads to a first plurality of spoking axes 232; the second spoking axis 240 leads to a second plurality of spoking axes 242; the third spoking axe 250 leads to a third plurality of spoking axes 252.

During the development of the present invention, it has been observed that the device 200 according to the present invention can see the optimised mechanical features thereof, particularly relative to the mechanical resistance thereof, for example in an assembly with a rim 400 connected to it at the level of the ends of the spoking axes of the disc 200, when the axis of the forces which are applied to it is in a plane, or as close as possible, of a plane parallel to the main axis of extension of the one-directional fibre bundles.

However, relative to the prior art and for numerous practical reasons, a disc 200 can be brought to be manufactured, which is not flat, for example in order to integrate mechanical elements in the volume cleared by the shaping, or to offset the axis of applied forces of the spoking axes and to thus obtain a certain flexibility of the final construction of the wheel 100.

Thus, according to an embodiment of the present invention, at least some of the spoking axes can be inclined or also curved relative to the plane wherein mainly extends the central zone 210, called main plane. This allows, for example, for the one-directional fibre bundles present at the level of these spoking axes to be mechanically included as return element, like springs.

Thus, if the spoking axes are shaped to have a curved shape, this induces a flexibility in the disc 200 and therefore in the wheel 100. This flexibility is perfectly controlled, since all the mechanical parameters, in particular those of the return element, are known.

In addition, if the return element comprising the inclined or curved spoking axes achieved the rectilinear shape before having reached the elastic limit thereof, it is possible to manage the reaction of the rim 400 under the mechanical force between the moment when the spoking axes react like springs and when the rim 400 has a certain flexibility under load and the moment, from a certain load level, when the system becomes rigid at the optimum of the traction properties of the fibres used.

As an example, and according to an embodiment coming from FIG. 5, the wheel disc 200 can have a particular geometry wherein the spoking axes are parallel to one another in each layer and wherein the crossings of spoking axes lead to a triangular shoulder 280.

This triangular shoulder 280 can have the orientation thereof angled during the shaping by stamping the disc 200. This allows to ensure an offset of the rim 400 with respect to the hub support 300 of the wheel 100 while conserving a freedom of form of the spoking axes with the aim of optimising the rigidity of the wheel 100.

The stamping can equally be concave or convex just as much as the desired mechanical properties are obtained by the shaping of at least one portion of the disc 200 and preferably at least one portion of the spoking axes, i.e. of the peripheral zone 220.

FIGS. 6a to 6e illustrate, according to a cross-sectional and profile view, a plurality of embodiments of the device 200 according to the present invention, wherein the spoking axes are inclined 261 and/or curved 262 relative to the main plane wherein extends the central zone 210. These inclinations and/or curvatures can also be described relative to the axis of rotation 310 of the wheel 100.

It must be noted that a way to incline and/or curve one or more spoking axes can comprise a step of stamping the device 200.

For example, in FIGS. 6a to 6e, the central zone 210 is noted to extend into the main plane. According to this embodiment, at least one spoking axis and preferably each spoking axis comprises at least one deformation zone 263. This deformation zone 263 corresponds to the zone of the spoking axis from which the spoking axis no longer extends into the main plane, but into a secondary plane.

According to the embodiments of FIGS. 6b and 6d, a spoking axis can comprise two successive deformation zones 263 and 264 so as to further have a portion extending into a tertiary extension plane.

According to the embodiments of FIGS. 6c to 6e, the spoking axes are curved and can have, in addition, an inclined portion 261.

Thus, FIG. 6a represents a stamped disc 200 of which the peripheral zone 220 comprises at least one inclined portion 261 relative to the main plane and to the axis of rotation 310 of the wheel 100. The junction between this inclined portion 261 and the remainder of the disc 200 is done at the level of a deformation zone 263.

FIG. 6b illustrates an embodiment wherein the peripheral zone 220 comprises a first inclined portion 261a and a second inclined portion 261b. The first inclined portion 261a is mechanically connected to the second inclined portion 261b by means of a deformation zone 263, the second inclined portion 261b being mechanically connected to the central zone 210 by an additional deformation zone 264.

FIG. 6c represents an embodiment substantially similar to that of FIG. 6a and this after the peripheral zone 220 comprises a curved portion 262 instead of the inclined portion 261 of FIG. 6a.

FIG. 6d illustrates an embodiment wherein the peripheral zone 220 comprises an inclined portion 261 and a curved portion 262.

The curved portion 262 is mechanically connected to the inclined portion 261 by a deformation zone 263, and the inclined portion 261 is connected to the central zone 210 by an additional deformation zone 264.

FIG. 6e represents an embodiment wherein the peripheral zone 220 comprises an inclined portion 261 extended from a curved portion 262, the curved portion 262 being mechanical connected to the central zone 210 by the inclined portion 261, itself being mechanically connected to the central zone 210 by a deformation zone 263.

Thus, the action of having stamped spoking axes, i.e. shaped to have a portion extending mainly into a plane different from the main plane, ensures the offset of the rim 400 with respect to the hub support 300 of the wheel 100, the flexibility of the wheel 100 is thus greater than that of a wheel having the same disc 200 construction, but with a Hat shape or with an offset only ensured in the central zone 210.

In addition, in the case where it is sought to conserve a maximum rigidity of the disc 200, the deformation zone 263 will be positioned in the zone situated between the axis of rotation 310 of the wheel 100 and the last crossing of one-directional fibre bundles. Particularly advantageously, the shape of the disc 200 and the orientation of the spoking axes allow to determine the angle wherein the force between the rim 400 and the axis of rotation 310 of the wheel 100 will be transmitted, that the wheel 100 carries one or more discs 200 facing one another as will be described below.

According to another embodiment, the one-directional fibre bundles can be mounted under stress, for example with a stressed extension.

These figures thus illustrate the large range of possible shapes for the device 200 according to the present invention. Advantageously, this shaping step, by stamping for example, of at least one portion of the disc 200 allows a shaping of the disc 200 according to the desire to optimise the rigidity or to find a certain flexibility if needed.

The shaping of the spotting axes allows to determine the axis according to which the one-directional fibre bundles are stressed by movements and the functional stresses of the wheel 100 at the level of the spoking axes thereof. This shaping, preferably by stamping, therefore, allows to control the flexibility of the wheel 100 and to adjust it to the functioning stresses.

FIGS. 7a to 7j, 8a and 8b and 9a to 9g represent an assembly comprising a first 201 and a second 202 device such as described above according to several embodiments of the present invention.

Particularly advantageously, the assembly of a first 201 and of a second 202 device according to the present invention, so as to form said assembly allows to orient the traction stresses on the peripheral zone 220 of each disc 201 and 202.

This assembly thus forms a so-called final disc.

Thus, according to these embodiments, a first disc 201 and a second disc 202 are disposed and integral with one another relative to the other.

Advantageously, these two discs 200 are disposed and integral such that the triangulation of the spoking axes of the first disc 201 and the spoking axes of the second disc 202 with the securing points 205 at the level of the rim 400 ensures the rigidity of the assembly of the wheel 100 by creating triangles in the transverse plane of the wheel 100, This the same when the spoking axes of each disc 201 and 202 have an angular offset between them in the transverse plane of the wheel 100, which induces a triangulation effect.

Thus, particularly advantageously, the present invention relates to an assembly of a first disc 201 and of a second disc 202 so as to form the final disc of a wheel 100. This allows to optimise the mechanical features thereof.

According to this embodiment, the first 201 and second 202 discs are integral with one another at the level of at least one securing zone 205 and are each integral with the periphery thereof on a rim 400 and/or on the other disc 201, 202.

Figure 7A:
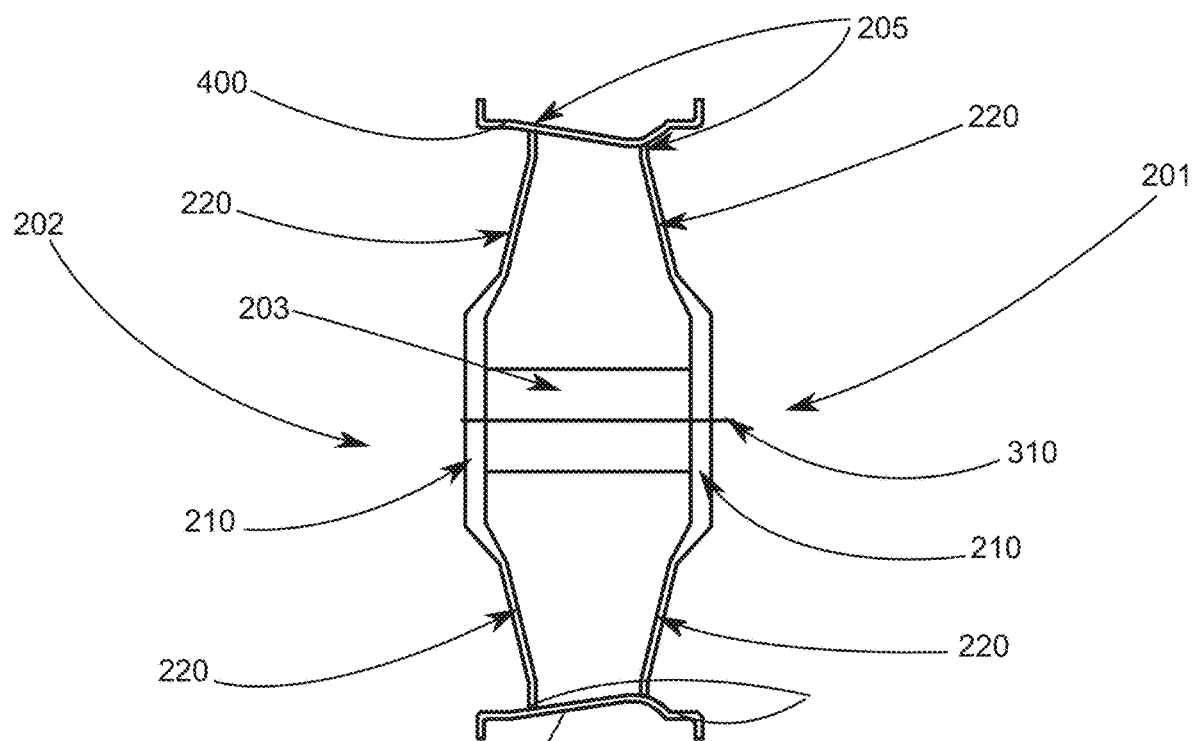
FIGS. 7a to 7j illustrate different embodiments of an assembly of two devices according to the present invention with a rim.
Figure 7B:
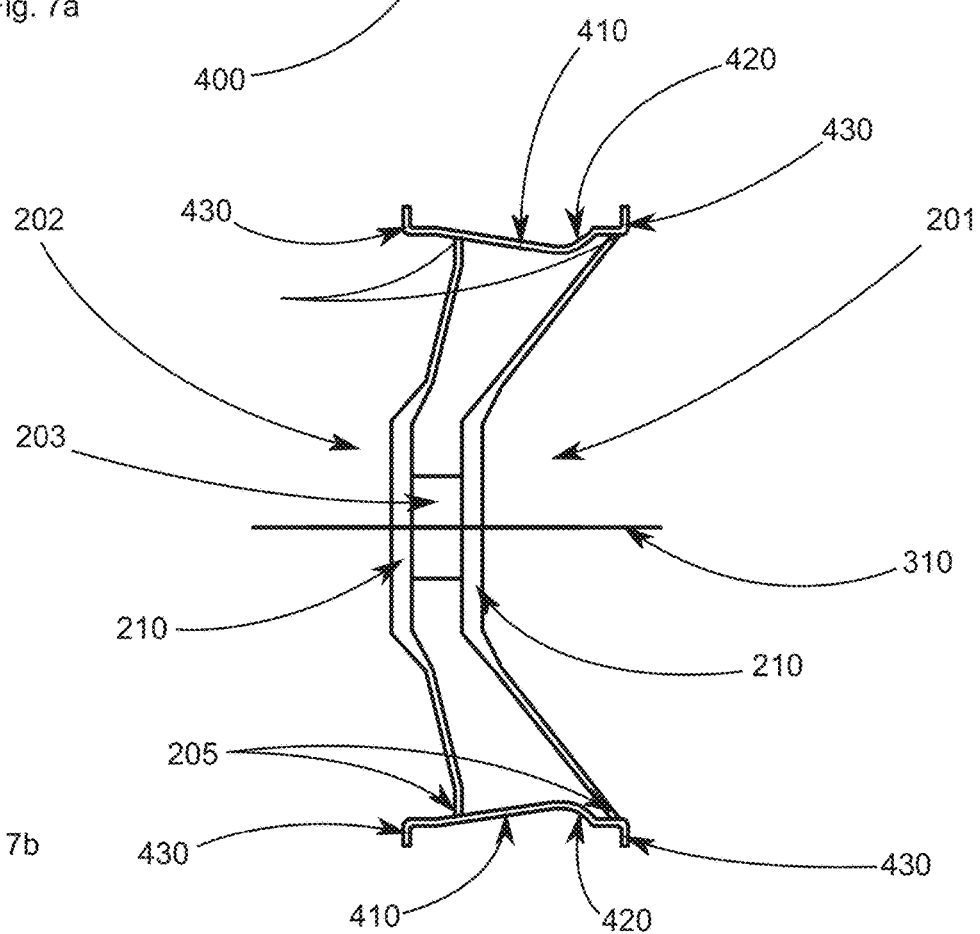
Figure 7C:
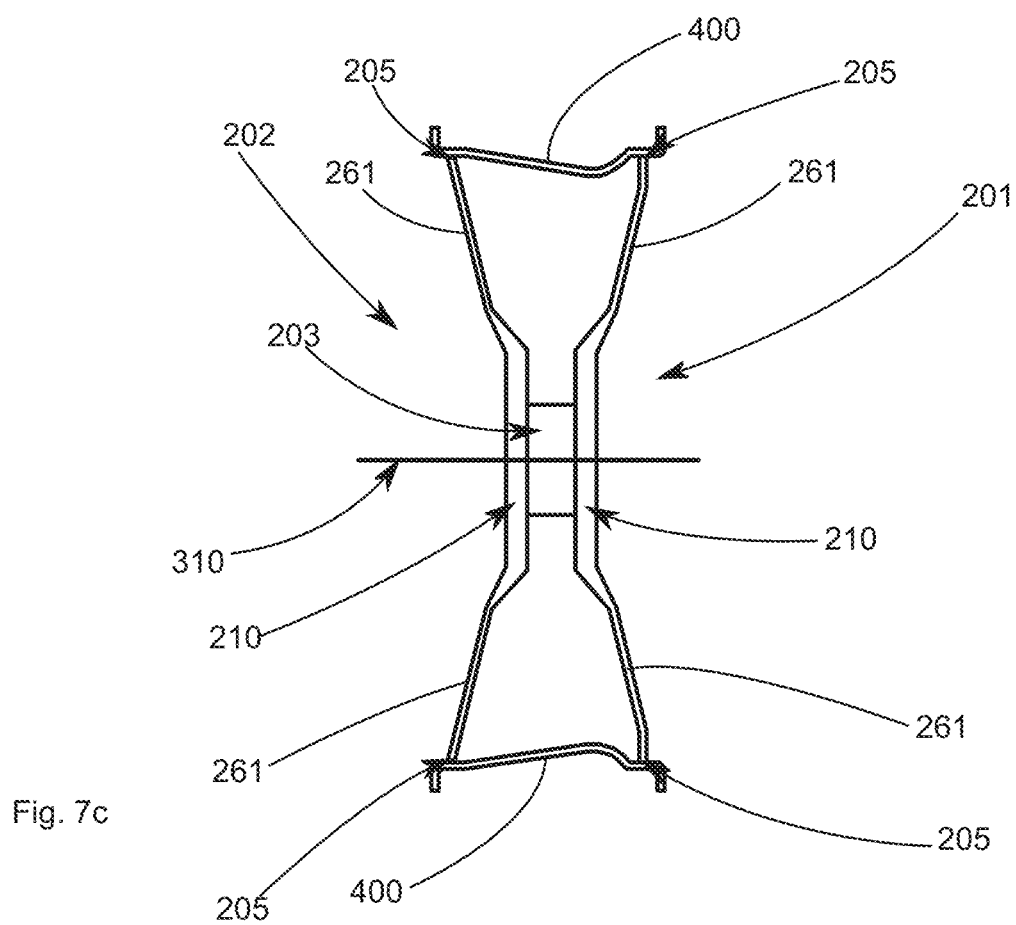
Figure 7D:
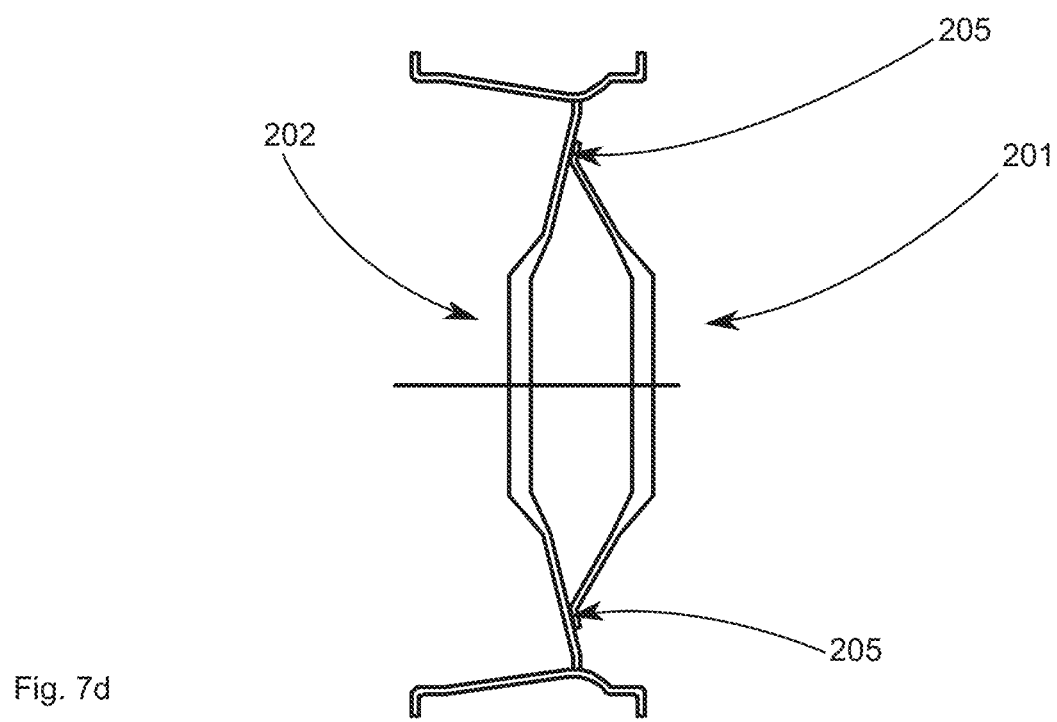
Figure 7E:
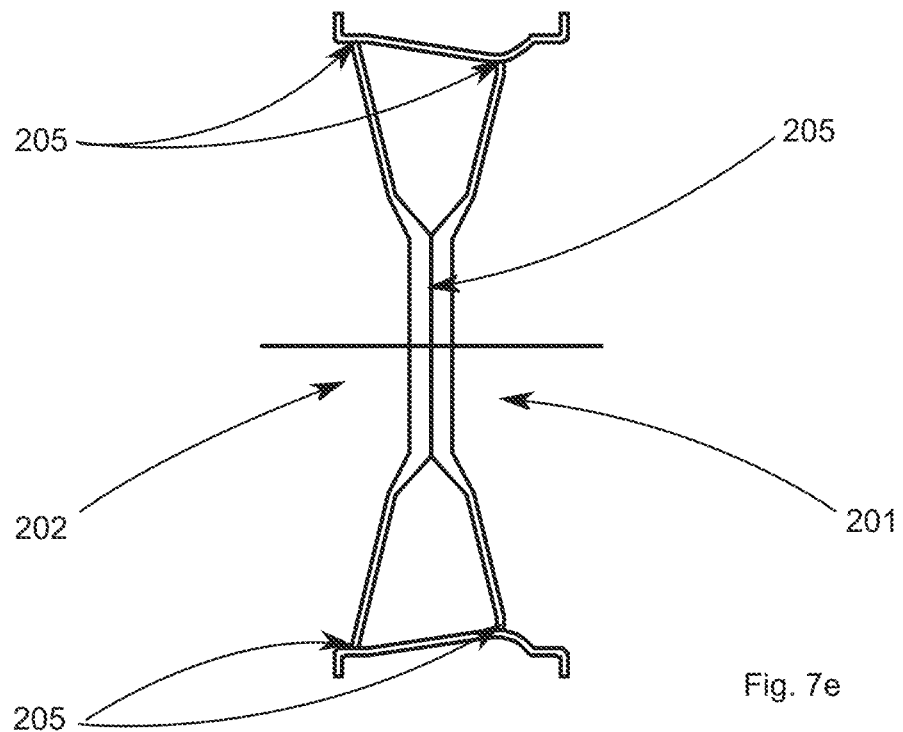

Advantageously, relative to the axis of rotation 310 of the wheel 100, the first 201 and the second 202 discs can be directly connected to one another, as illustrated in FIG. 7e, and/or be connected to a spacer 203, as illustrated in FIGS. 7a, 7b and 7c.

According to an embodiment, the first 201 and the second 202 discs can be held positioned to one another in a controlled position by a structure external to the wheel 100 and mechanically linked to the axis of rotation 310 of the wheel 100, like for example by a spacer 203.

Figures 8A, 8B:
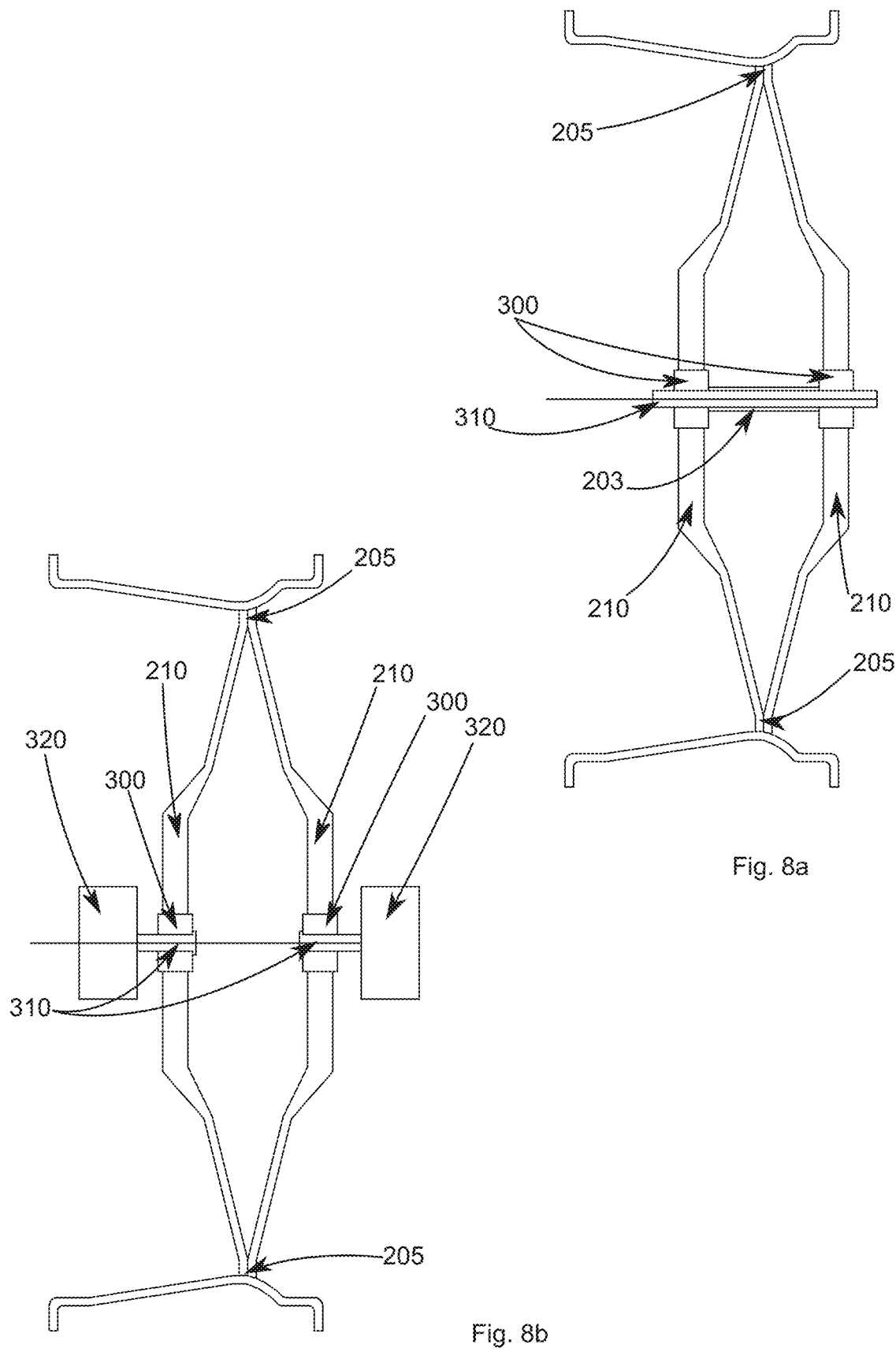
FIGS. 8a and 8b illustrate two embodiments of mounting a hub support in the case of an assembly according to the present invention.

Preferably, this spacer 203 can be mounted on the axis of rotation 310 of the wheel 100, and can maintain the space between the discs 201 and 202, as illustrated in FIG. 8a.

According to another embodiment, the first 201 and the second 202 disc can be held together in a controlled position by a structure external to the wheel 100 and mechanically linked to the axis of rotation 310 of the wheel 100, like for example by separated and coaxial hub supports 300 connecting each disc 201 and 202 to a portion of the structure supporting the wheel 100, as illustrated in FIG. 8b.

Preferably, the spacer 203 can be integrated to one of the discs 201 and 202 or partially to the two discs, if it is included in the manufacturing thereof or added during the assembly of the wheel 100 by any means, that it is mechanical, by gluing or by welding.

Advantageously, to obtain the triangulation effect in the transverse plane of the wheel 100, the first 201 and second 202 discs can be deviated in the centre thereof, maintained by a suitable spacer 203 like in FIG. 8*a* or carried by separate hub supports 300, like in FIG. 8*b* and converge towards one another at the level of the rim 400.

To obtain this triangulation effect, the first 201 and second 202 discs can also be connected at the level of the central zone 210 thereof and diverge at the level of the rim 400 to obtain another type of triangulation, a so-called inverted triangulation, as illustrated in FIG. 7*e*.

Figure 7F:
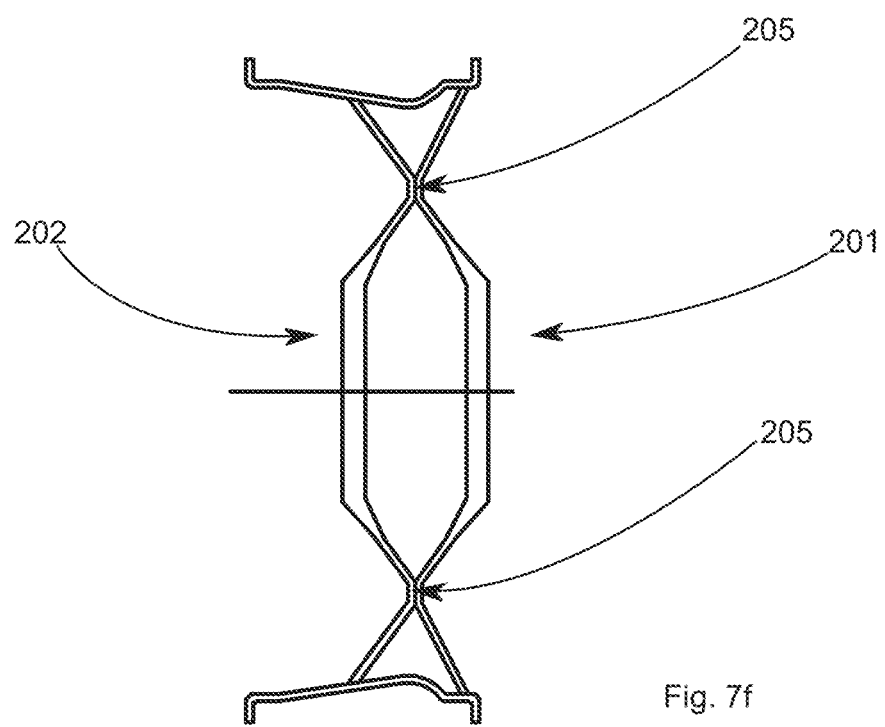
Figure 7G:
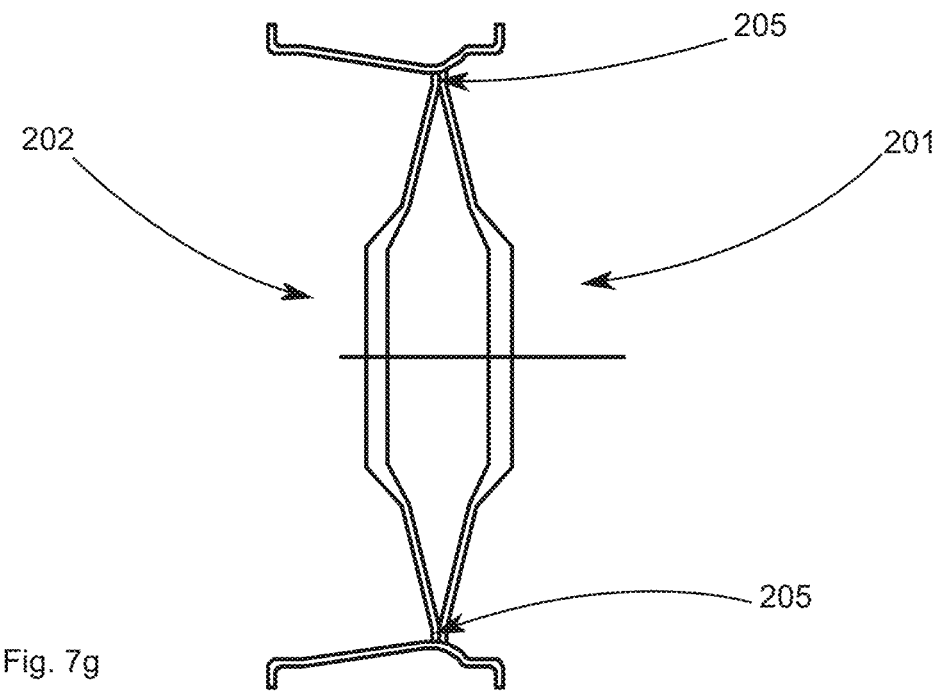
Figure 7H:
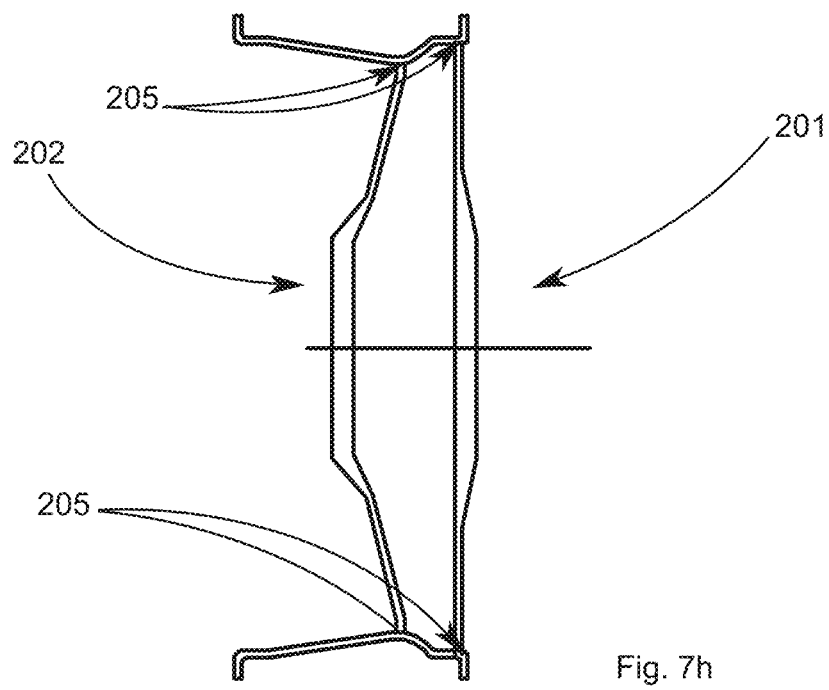
Figure 7I:
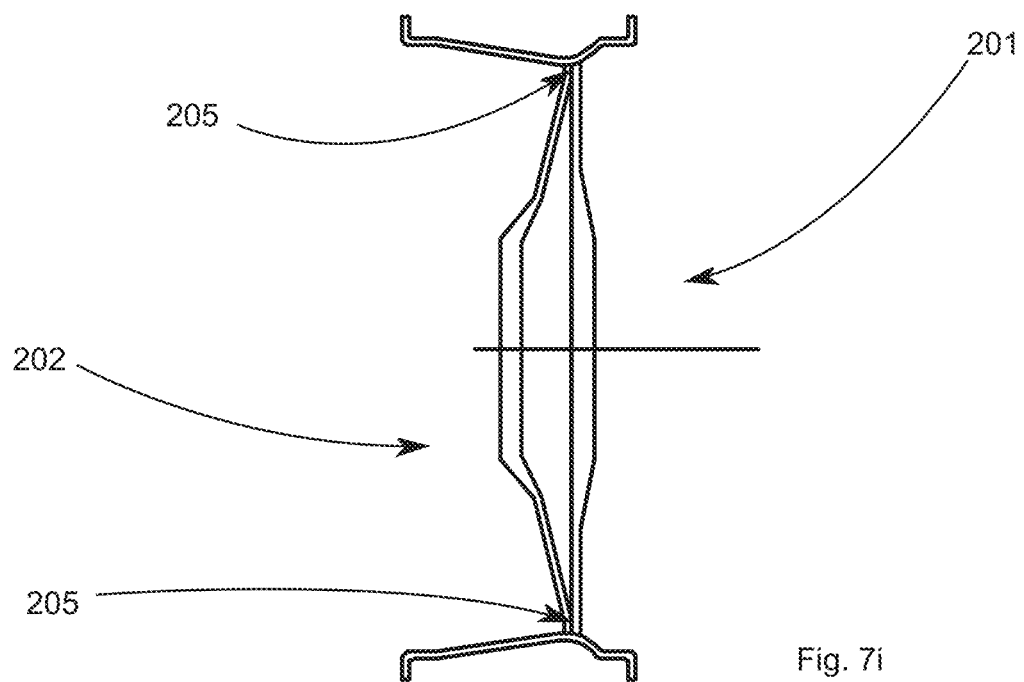

According to another embodiment, it is also possible to obtain the triangulation effect if the first 201 and second 202 discs, preferably stamped, are deviated at the level of the central zone 210 thereof, deviated at the level of the rim 400 and are integral at the level of a portion of the peripheral zone 220 creating two triangulations opposed by the tip thereof, as is illustrated in FIG. 7*f*.

According to an embodiment, each disc 201 and 202 can be flat and integral with one another at the level of the rim 400 and/or the central zone 210 thereof by means of a spacer 203, for example.

Figure 7J:
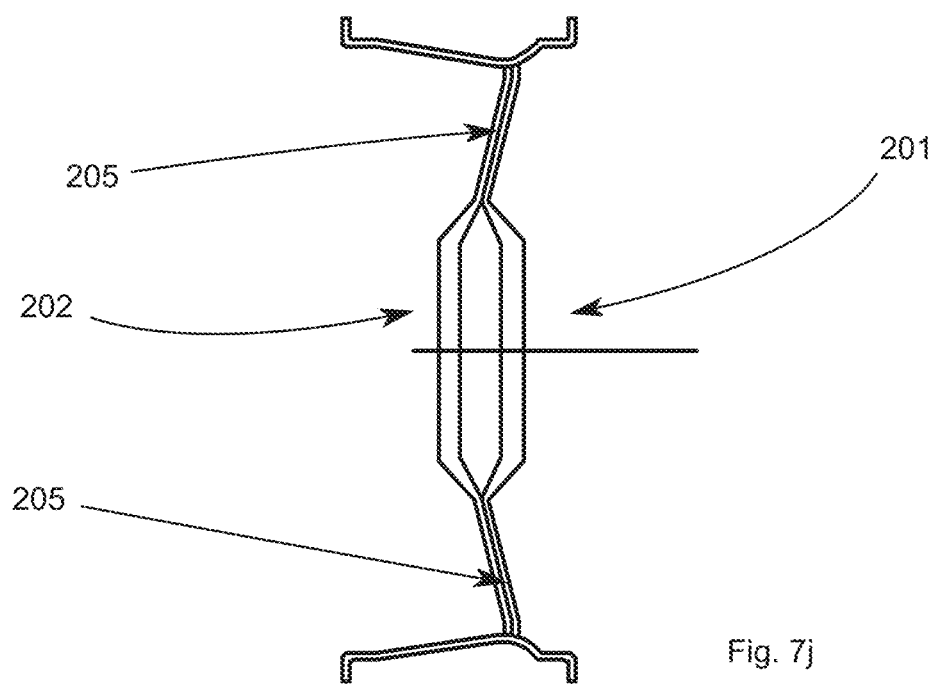

According to another embodiment, the first 201 and the second 202 discs are both stamped complementarily such that the central zones 201 thereof are parallel relative to one another and that the spoking axes thereof are parallel relative to one another while being inclined relative to the central zones 210. This embodiment is illustrated in FIG. 7*j*, for example.

More generally, the present invention relates to an assembly of at least one first 201 and one second 202 disc which could comprise any combination of stampings of the disc(s) 201 and 202, as described above and being integral with the rim 400.

According to the embodiments of FIGS. 8*a* and 8*b*, for the rims 400 wherein the hub support 300 is carried by the wheel 100, in the motorcycle or bike wheels, for example, it is possible to associate at least two discs 201 and 202 facing one another, each carrying a winding or any device allowing the rotation of the wheel 100 about the axis of rotation 310 thereof and, either installing a spacer 203 on the axis of rotation 310 of the wheel 100 like in FIG. 8*a*, between the discs 201 and 202 such that the rigidity of the wheel 100 at the level of the axis of rotation 310 is ensured by the structure of the discs 201 and 202, or to maintain each portion of the hub support 300, carried by a disc 201 and 202, in place separately, as illustrated in FIG. 8*b*.

Figure 9A:
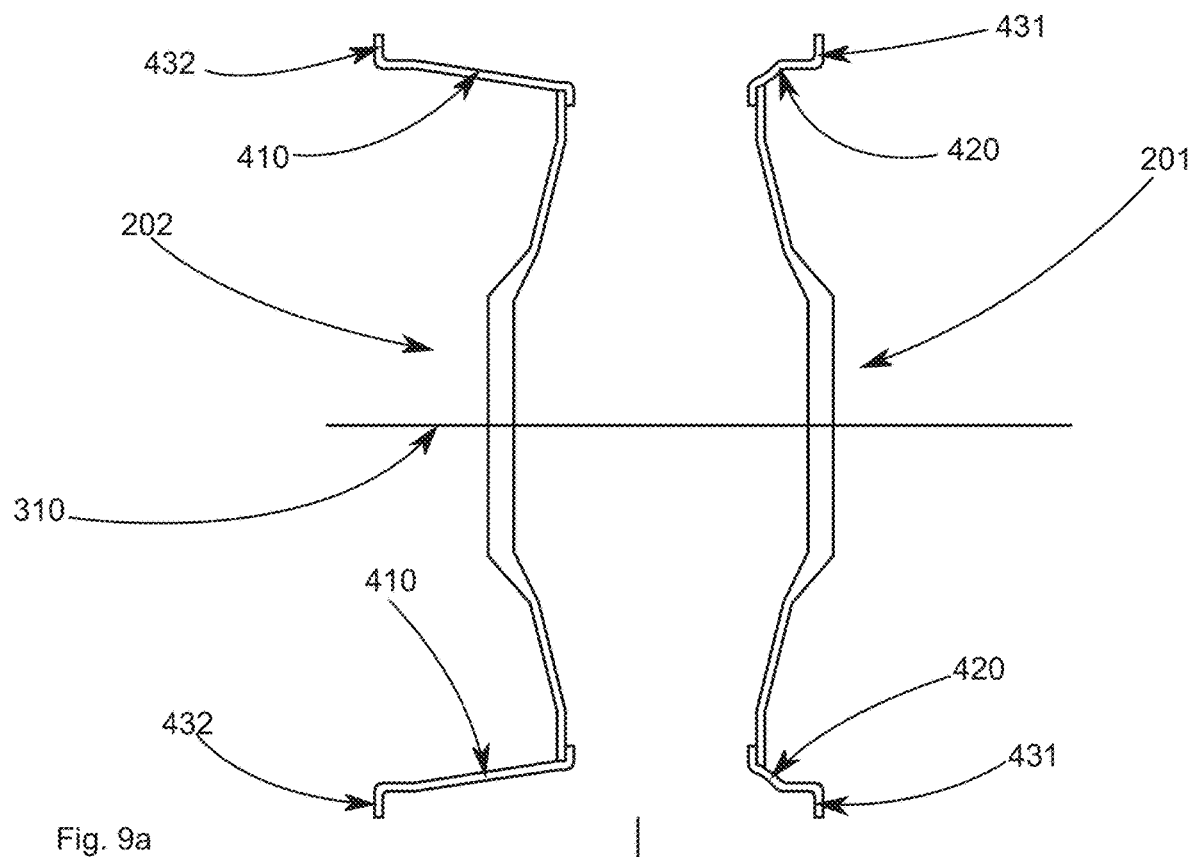
FIGS. 9a to 9g illustrate different embodiments of a junction between an assembly according to the present invention and a rim which could be in two portions.
Figure 9B:
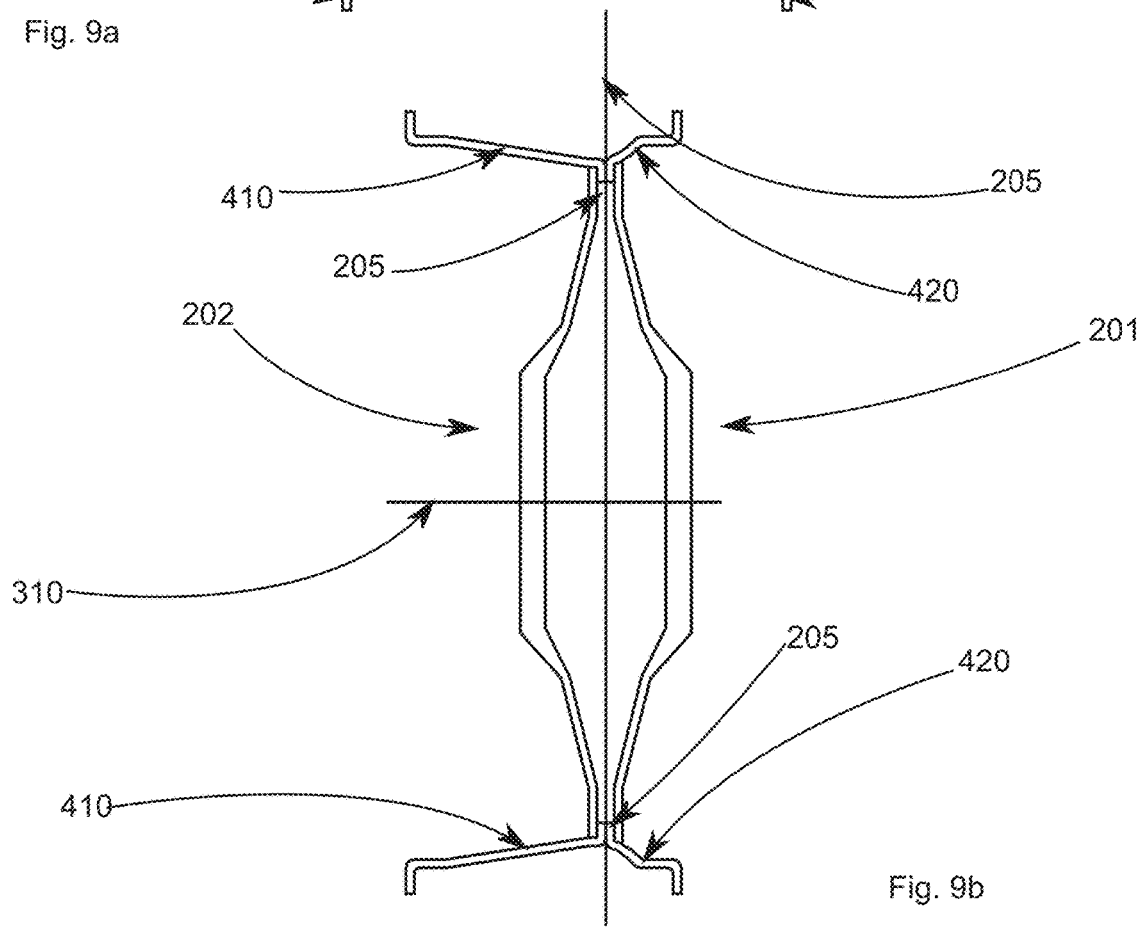

According to the embodiments illustrated through FIGS. 9*a* and 9*b*, the first 201 and the second 202 discs can each of them carry one portion, preferably complementary, of a rim 40.

For example, a rim 400 can consist of two portions 401 and 402, each being carried by a different disc 201 and 202 such that the securing of the first disc 201 and with the second disc 202 ensures the formation of the rim 400, preferably in the entirety thereof.

Thus, in FIG. 9*a*, the first disc 201 comprises, at the level of the peripheral zone thereof 220, an integral portion of a first portion 401 of the rim 400, and carrying the flange 420 of the rim 400 and a first edge 431 of the rim 400.

The second disc 202 itself comprises, at the level of the peripheral zone 220 thereof, an integral portion of a second portion 402 of the rim 400, and carrying the rim bottom 410 of the rim 400 and a second edge 430 of the rim 400.

According to this embodiment, the rim 400 can comprise portions made of composite materials.

FIGS. 9*c* to 9*g* represent embodiments wherein the spoking axes of one or of two discs being extended 270 to partially circumvent at least one portion of the rim 400.

Figure 9C:
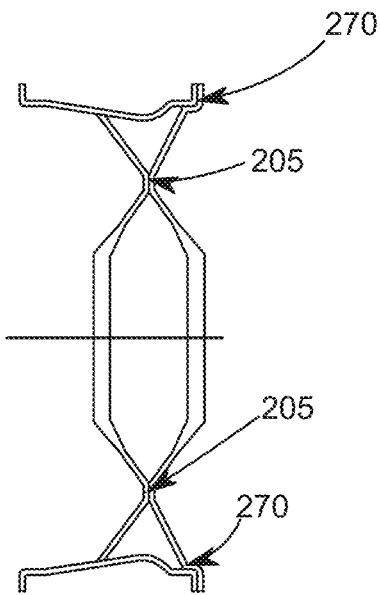
Figure 9D:
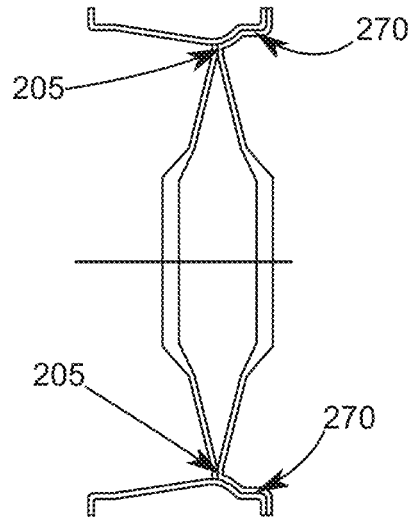

According to these embodiments, the spoking axes, i.e., the one-directional zones of the disc joining the rim 400 car be extended by passing under the base of the rim 400 to the flange 420, as illustrated in FIG. 9*c* and possibly to the edge 430, as illustrated in FIG. 9*d*.

According to this embodiment, the peripheral zone 220 comprises extensions 270 of the spoking axes.

Figure 9E:
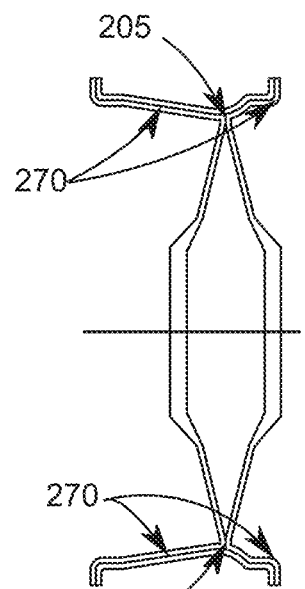

According to the embodiment of FIG. 9*e*, each of the discs can be extended to be partially shaped according to the rim 400 and thus pass under a complementary portion of the rim 400 by means of extensions 270.

Advantageously, at least one spoking axis can be extended to as to partially constitute at least one portion of the rim 400.

Figure 9F:
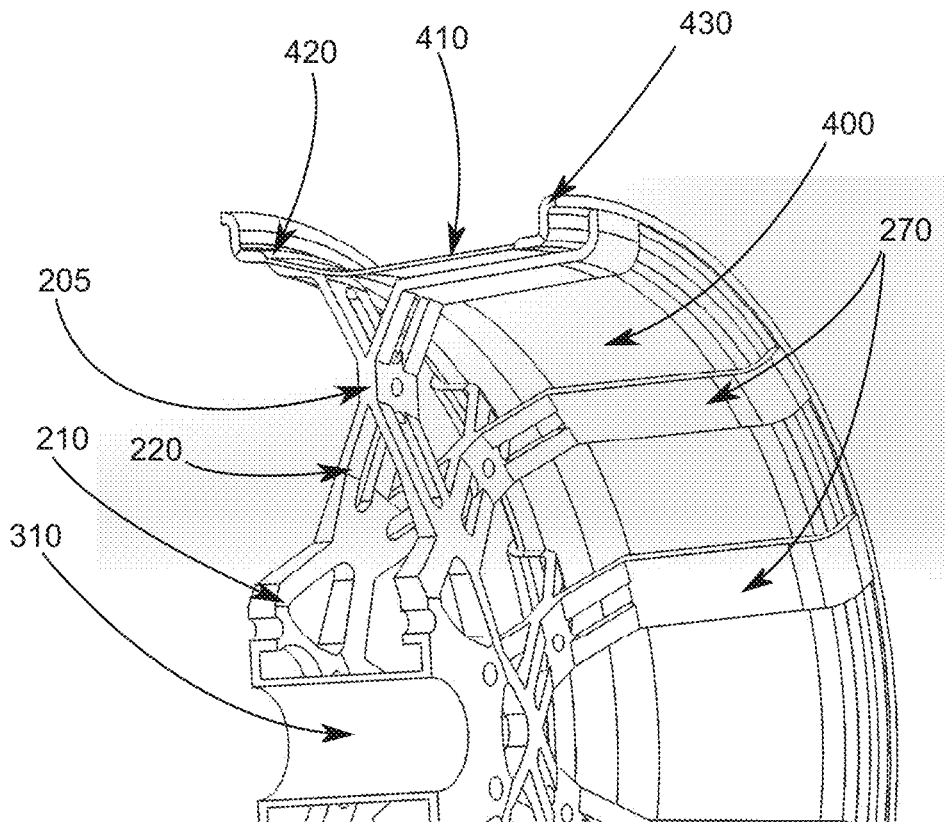

Thus, FIG. 9*f* is a cross-sectional and perspective view of a wheel comprising a first disc 201 and a second disc 202 forming a final disc.

The first disc 201 and the second disc 202 being integral at the level of a securing zone 205 situated in the peripheral zone 220. It is noted in this figure that the spoking axes of each disc comprise extensions 270 extending from the peripheral zone under the rim and to the edges 430 of it.

Advantageously, the flange 420 of the rim 400 can be partially or totally made by winding layers comprising one-directional fibre bundles about the axis of rotation 310 of the wheel 100. This type of construction has the advantage of being able to be made, like for the manufacturing of the discs, by an automaton which can be either independent of the manufacturing of the disc, or integrated to the manufacturing of it and synchronised with the other elements of the machine described below and intended for the mechanized manufacturing of the present invention.

Advantageously, the edge 430 of the rim 400 can be partially or totally made by winding layers comprising one-directional fibre bundles about the axis of rotation 310 of the wheel 100. The manufacturing thereof responding to the same logic as that of manufacturing the flange 420, the same features and specificities as those relating to the manufacturing of the flange 420 are applied to this portion of the rim 400.

According to an embodiment, the rim bottom 410 can be mechanically assembled, glued, welded or integrated in a composite manufacturing wherein the two discs carrying the flange 420 thereof and the edge 430 thereof would be integrated. There again, the spoking axes can be extended from the disc to the flange 420 by bordering the rim bottom 410 to go to the flange 420, even to the edge 430.

Advantageously, the rim bottom 410 can be partially or totally made by winding layers comprising one-directional fibre bundles about the axis of rotation 310 of the wheel 100. The manufacturing thereof responding to the same logic as that of manufacturing the flange 420 or the edge 430, the same features and specificities as those relating to the manufacturing of the flange 420 or of the edge 430 are applied to this portion of the rim 400.

According to an embodiment, the rim 400 is thus partially or totally made of composite materials from one or more layers comprising at least one one-directional fibre bundle. A rim 400 thus formed allows to return all the stresses undergone by the spoking axes of each device.

Preferably, the rim 400, whether made of composite materials or not, can be supported by the extension 270 of at least one portion of the spoking axes of one or two discs 201 and 202.

Advantageously, the wheel 100 thus formed can comprise a disc 200 formed of a first 201 and of a second 202 devices and of a rim 400 partially formed at least by composite materials and/or partially or fully supported by one or more extensions 270 of spoking axes.

Figure 9G:
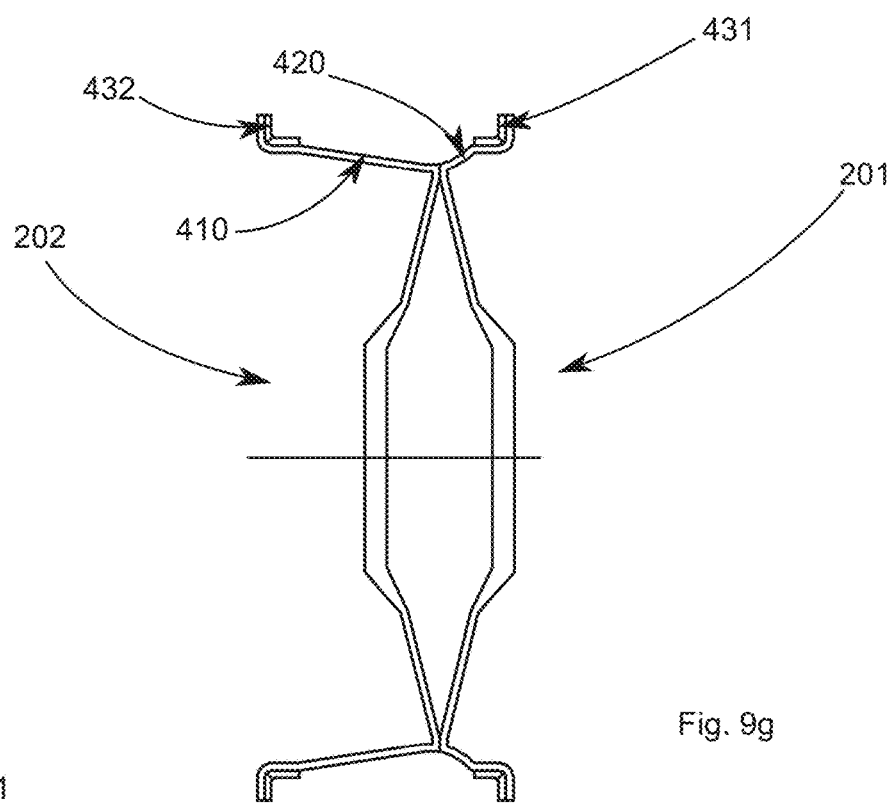

The spoking axes of the wheel 100 can, in addition, be extended so as to carry the flange 420 and/or the edge 430 of the rim 400 and/or the rim bottom 410, as illustrated in FIG. 9g.

The properties of the wheel 100 can thus be managed according to the type of construction and on the shape of the discs, each having an action which is found to be a function of the specific features thereof and the assembly reacting according to the features of the association of said discs.

Figure 12:
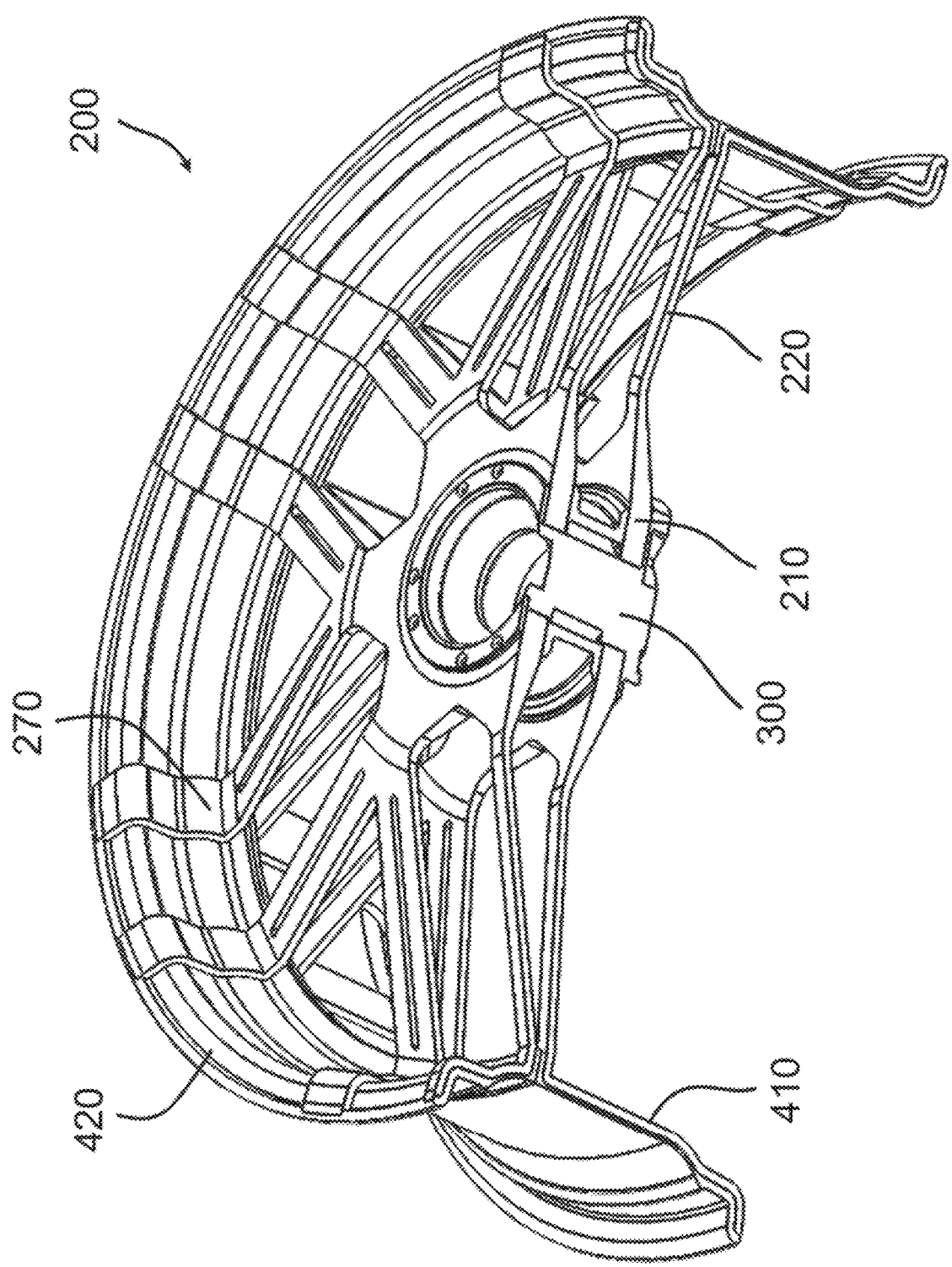
FIG. 12 shows an example of a cross-section of the device of the invention, involving different zones formed from layers.

FIG. 12 shows another version of an embodiment of the device, and reveals more specifically the close structural intertwining between the central zone 210 and the peripheral zone 220. The peripheral zone 220 here has spokes organised in pairs, each pair having an orientation with a preponderant radial direction, so as to join the hub and the rim together. The spokes here correspond to three axes of extension, corresponding to three layer winding directions.

In the zone 220, in each axis of extension, the layer advantageously forms a stack of layers, each having a favoured mechanical resistance orientation, corresponding to the direction of the fibres oriented along this axis of extension.

In the zone 210, the layers of the different axes of extension being superposed as the winding thereof, forming an assembly of alternate layers, this alternance being preferably regular and allowing, successively to stack, layers having different bundle orientations.

The consequence is that the peripheral zone 220 is formed of portions having highly anisotropic mechanical properties, about the axis of extension thereof, corresponding to that of the fibres. On the contrary, in the central zone 210, the mechanical properties are more isotropic, through the stack of the one-directional bundles having different orientations.

It will be noted that the cross-section of FIG. 12 reveals the differences of thickness between the zone 210 (thicker, as formed by the stack of more layers) and the zone 220. For example, if three layers are used, the zone 220 will be three times thinner than the zone 210. Moreover, in this example, the progressive overlapping of the layers forms a portion of the central zone 210 with a thickness increasing to a maximum thickness corresponding to the stack of all the layers.

FIG. 12 moreover shows the connection of the distal end of the peripheral zone on a rim portion. An extension 270 of the portions serving to form the peripheral zone 220 is glued possibly at the level of the flange 420 of the rim, Thus, an effective distribution of the load coming from the spokes is achieved.

Method for Manufacturing the Disc:

The present invention also relates to a method for manufacturing a device 200 such as presented above.

Particularly advantageously, composite materials allow, due to the anisotropy thereof, to manufacture one-piece devices 200 of which the zones have different properties according to the distribution and the nature of the one-directional fibre bundles in each of them.

According to an embodiment, the method according to the present invention comprises at least the following steps:
Positioning of the first layer 221a about the first axis of extension 231 so as to define at least one first spoking axis 230 of the wheel 100;
Positioning of the second layer 222a about the second axis of extension 241 so as to define at least one second spoking axis 240 of the wheel 100 different from the first spoking axis 230 of the wheel 100;
Positioning of the third layer 223a about the third axis of extension 251 so as to define at least one third spoking axis 250 of the wheel 100 different from the first spoking axis 230 of the wheel 100 and of the second spoking axis 240 of the wheel 100.

Advantageously, and in order to form in the central zone 210, the one-directional stack 211, the first 221a, the second 222a and the third 223a layer are disposed relative to one another so as to be superposed at least partially at the level of the central zone 210.

Preferably, this method can further comprise at least the following steps:
Folding of the first layer 221a on itself by superposing it to the second layer 222a at the level of the central zone 210 and to itself at the level of the peripheral zone 220;
This folding of the first layer 221a is not necessarily a folding consisting of putting the first layer 221a in contact with a portion of itself. In particular, and preferably, the first layer 221a is not folded on itself so as to be in contact with itself directly. It is folded on itself so as to surround a portion of the second layer 222a, preferably said portion of the second layer 222a being superposed to a portion of the first layer 221a.
Thus, this folding consists of forming a multidirectional stack 211 comprising a portion of the first layer 221a, a portion of the second layer 222a, then another portion of the first layer 221a, and preferably according to this order.
Folding of the second layer 222a on itself by superposing it to the first layer 221a at the level of the central zone 210 and to itself at the level of the peripheral zone 220. Like for the first layer 221a, this folding aims for the same objectives, namely continuing the multidirectional stack 211 at the level of the central zone 210 by adding another portion of the second layer 222a to the multidirectional stack 211 described above.
Folding of the third layer 223a on itself by superposing it to the first layer 221a and/or to the second layer 222a at the level of the central zone 210 and to itself at the level of the peripheral zone 220. Like for the first 221a and the second layer 222a, this folding aims for the same objectives namely continuing the multidirectional stack 211 at the level of the central zone 210 by adding another portion of the third layer 223a to the multidirectional stack 211 described above.

By repeating these steps, the central zone 210 is densified by increasing the thickness of the multidirectional stack 211, this thickness being taken along the axis of rotation 310 of the wheel 100.

It must be noted that, according to an embodiment, the number of spokes remains constant about the axis of rotation 310 of the wheel 100; however, each spoking axis comprises a plurality of levels corresponding to each folding. Thus, the thickness of each spoking axis, about the axis of rotation 310 of the wheel 100, increases at each folding.

According to an embodiment, the formation of the disc 200 can comprise a step of cutting at least one portion of one or more spoking axes so as to lighten the peripheral zone 220, for example, as has been presented above through FIG. 5.

Thus, the method according to the present invention can further comprise at least one step of cutting at least one portion of the first 221a, of the second 222a and/or of the third 223a layer at the level of the peripheral zone 220 so as to form respectively a first 232, a second 242 and/or a third 252 plurality of spoking axes of the wheel 100 from respectively the first 221a, the second 222a and/or the third 223a layers.

Likewise, as presented above, the disc 200 can be stamped so as to not be flat, and to not extend into the assembly thereof in the main plane. Thus, the present method can further comprise a stamping step configured to deform at least one portion of the first 221a and/or of the second 222a and/or of the third 223a layers. The flexibility of the wheel 100, and the mechanical response thereof can thus be controlled during the manufacturing of the disc 200.

The present method can also further comprise a step of forming at least one portion of the rim 400 of the wheel 100 by winding at least one additional layer around the peripheral zone 220 relative to the axis of rotation 310 of the wheel as has been described above.

Machine for Implementing the Manufacturing Method: Finally, the present invention also relates to a machine 500 for implementing the method described above.

The present invention 500, which will be described in more detail below, allows to manufacture, on an industrial scale, the device 200 described above, i.e. at an increased production speed.

According to an embodiment, the present machine 500 is configured to dispose the layers 221a, 222a, 223a at a high frequency. Preferably, this machine 500 uses layers 221a, 222a, 223a wound forming coils 511, 521, 531.

Each layer 221a, 222a, 223a is thus unwound from a coil 511, 521, 531 carried by a mobile arm 510, 520, 530 which describes a rotation around parts delimiting the end of the one-directional bundles to be formed. These parts are called here fixed arms 512, 522, 532 and abutment arms 513, 523, 533.

The mobile arms 510, 520, 530 are advantageously synchronised in rotation to not touch one another during the operation of the machine 500. Advantageously, this synchronicity allows the various mobile parts of the machine 500 to not collide with one another.

This machine 500 thus allows to reach very high speeds thanks to a continuous movement which can be accelerated as much as the resistance of the layers 221a, 222a, 223a allows it, Preferably, the wound layers 221a, 222a, 223a are held at Feast at the two ends thereof at the level respectively of the abutment arms 513, 523, 533 and of the fixed arms 512, 522, 532 while the mobile arm 510, 520, 530 carrying the material to be unwound rotates about an axis parallel to that of the two ends of the layer 221a, 222a, 223a.

Below, an unwinding assembly will be called an assembly comprising a mobile arm 510, 520, 530 carrying a layer coil 511, 521, 531, a fixed arm 512, 522, 532, and an abutment arm 531, 532, 533.

Advantageously, the machine 500 comprises as many unwinding assemblies as there are layers.

Figure 10:
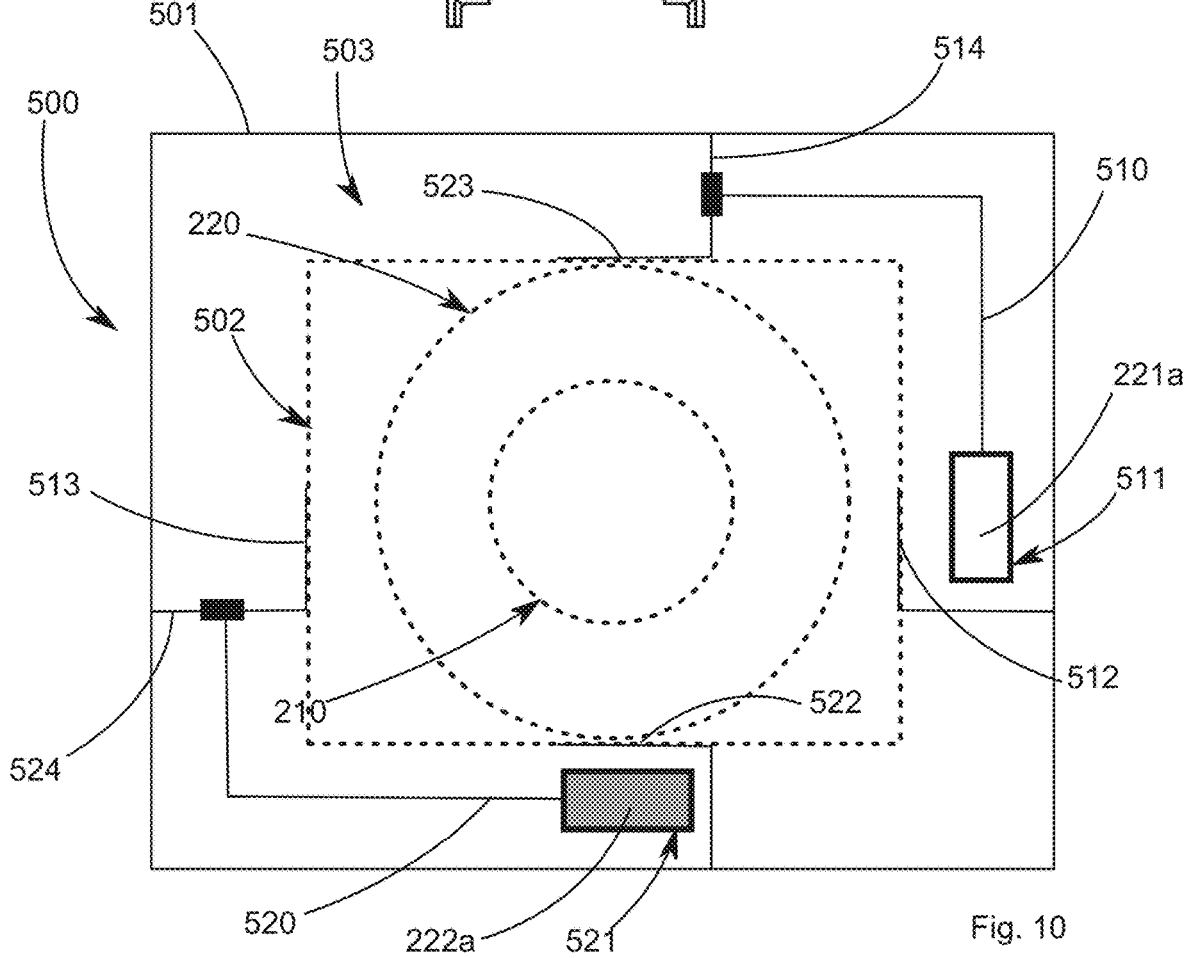
FIG. 10 represents a machine for implementing a manufacturing method according to an embodiment of the present invention.

FIG. 10 represents a machine 500, as a top view, according to an embodiment of the present invention, configured to form a disc 200 comprising four spoking axes formed from two layers 221a and 222a.

This machine 500, according to an embodiment, comprises a frame 501, a first mobile arm 510 in rotation about an axis parallel to the axis of extension 241, a second mobile arm 520 in rotation about an axis parallel to the first axis of extension 231, a first fixed arm 512, a first abutment arm 513, a second fixed arm 522 and a second abutment arm 523.

It will be noted that the first mobile arm 510 in rotation carries a first coil 511 comprising the first wound layer 221a. The second mobile arm 520 in rotation carries a second coil 521 comprising the second wound layer 222a.

Preferably, the first fixed arm 512 is parallel to the first coil 511 and to the axis of rotation of the first mobile arm 510.

Preferably, the second fixed arm 522 is parallel to the second coil 521 and to the axis of rotation of the second mobile arm 520.

According to an embodiment, each mobile arm is integral with the frame 501 by a part passing through the axis of rotation of said arm and/or the movement plane of the coil supports.

It will also be noted that the first mobile arm 510 in rotation is supported by a first support part 514 integral with the frame 501. The second mobile arm 520 in rotation is supported by a second support part 524 integral with the frame 501.

According to an embodiment, the first support part 514 extends along an axis of extension passing through the circuit over which the first mobile arm 510 is moved. Preferably, the first support part 514 extends along an axis of extension orthogonal to the first axis of extension 241. Advantageously, the first support part 514 extends along an axis of extension colinear to the axis of rotation of the first mobile arm 510.

According to an embodiment, the second support part 524 extends along an axis of extension passing through the circuit over which the second mobile arm 520 is moved. Preferably, the second support part 524 extends along an axis of extension orthogonal to the second axis of extension 231. Advantageously, the second support part 524 extends along an axis of extension colinear to the axis of rotation of the second mobile arm 520.

Figure 11A:
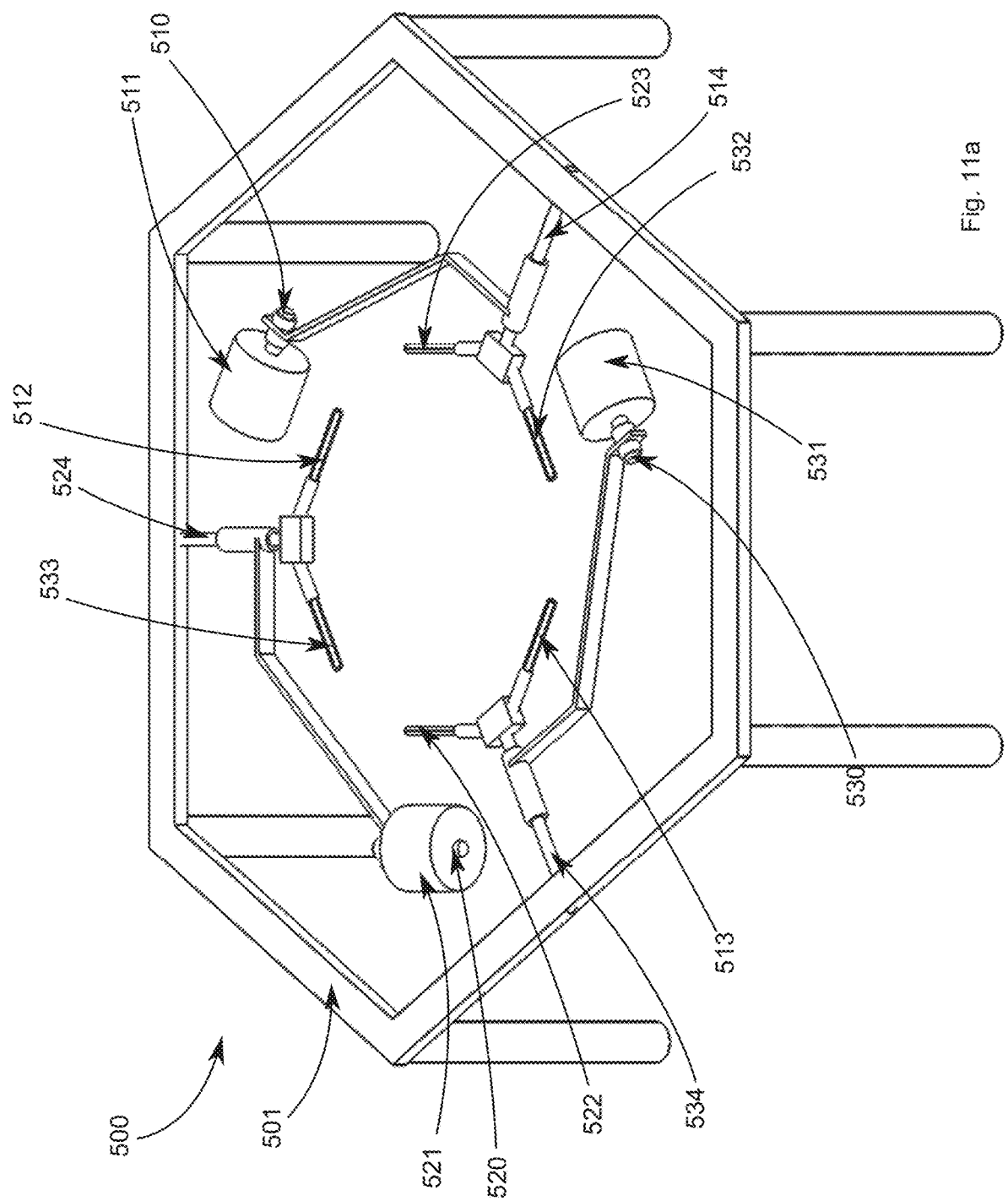
Figure 11C:
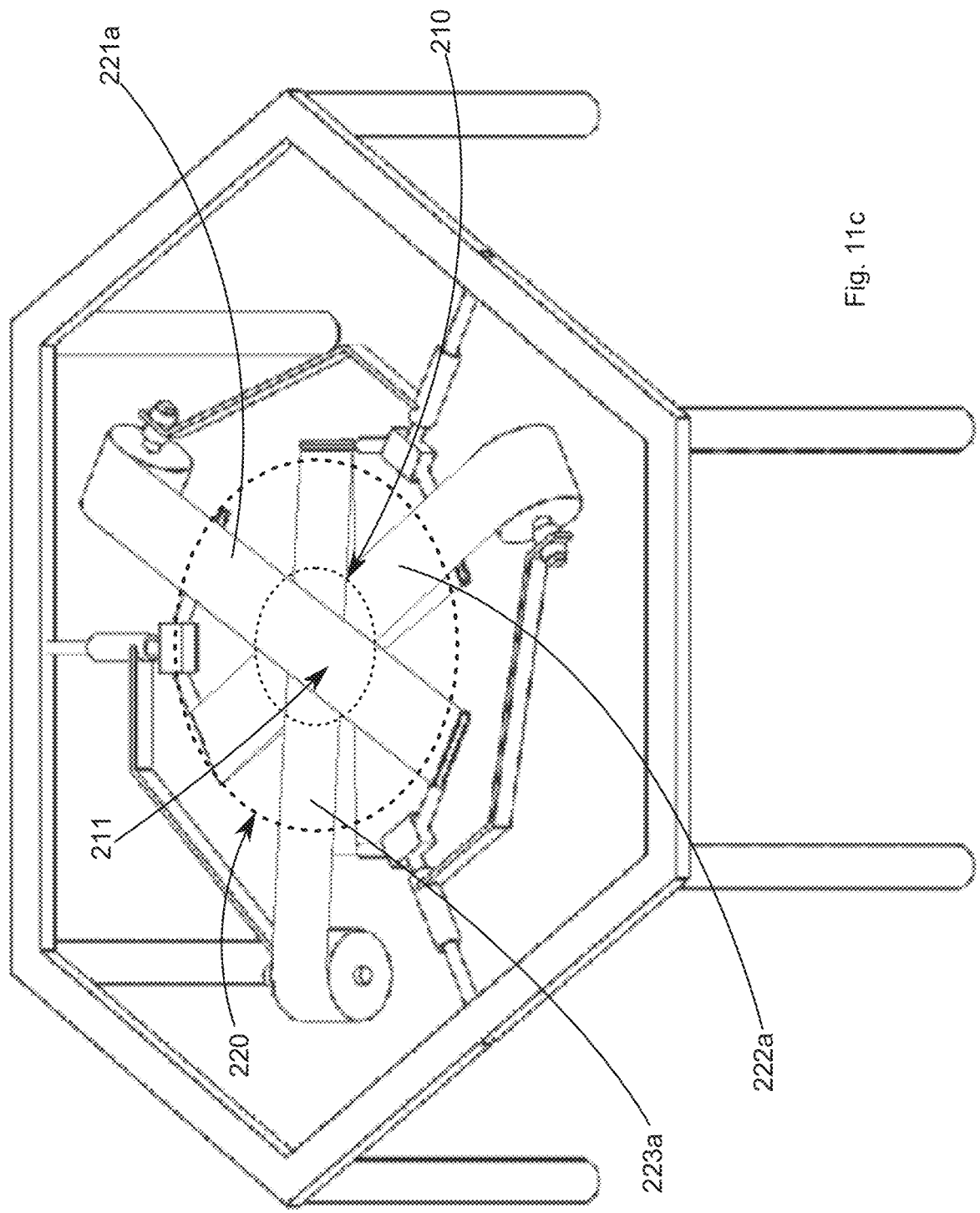

FIGS. 11a, 11b and 11c represent a machine 500 according to another embodiment of the present invention configured to form a device from three layers.

According to this embodiment, the machine 500 comprises at least:
One frame 501 comprising a central portion 502 and a peripheral portion 503 and supporting at least:
One first mobile arm 510 extending along a direction orthogonal to the first axis of extension 231 and carrying at least one first coil 511 comprising a winding of the first layer 221a, the winding of the first layer 221a being done along an axis orthogonal to the first axis of extension 231;
One second mobile arm 520 extending along a direction orthogonal to the second axis of extension 241 and carrying at least one second coil 521 comprising a winding of the second layer 222a, the winding of the second layer 222a being done along an axis orthogonal to the second axis of extension 241;
One third mobile arm 530 extending along a direction orthogonal to the third axis of extension 251 and carrying at least one third coil 531 comprising a winding of the third layer 223a, the winding of the third layer 223a being done along an axis orthogonal to the third axis of extension 251;
Preferably, the first 510, the second 520 and the third 530 mobile arms are respectively configured to unwind the first 221a, the second 222a and the third 223a layers along respectively the first 231, the second 241 and the third 251 axes of extension in the peripheral portion 503 and in the central portion 502 of the frame 501 so as to superpose at least one portion of the first 221a and/or of the second 222a and/or of the third 223a layer with a portion of the first 221a and/or of the second 222a and/or of the third 223a layer at the level of the central portion 502 of the frame 501.

Thus, preferably, the frame 501 further supports at least:

One first support part 514 of the first mobile arm 510 extending preferably along an axis of extension orthogonal to the first axis of extension 231;

One first fixed arm 512 extending along a direction parallel to the first mobile arm 510;

One first abutment arm 513 extending along a direction parallel to the first mobile arm 510, the first fixed arm 512 and the first abutment arm 513 being disposed on either side of the central portion 502;

One second support part 524 of the second mobile arm 520 extending preferably along an axis of extension orthogonal to the second axis of extension 241;

One second fixed arm 522 extending along a direction parallel to the second mobile arm 520;

One second abutment 523 extending along a direction parallel to the second mobile arm 520, the second fixed arm 522 and the second abutment arm 523 being disposed on either side of the central portion 502;

One third support part 534 of the third mobile arm 530 extending preferably along an axis of extension orthogonal to the third axis of extension 251;

One third fixed arm 532 extending along a direction parallel to the third mobile arm 530;

One third abutment arm 533 extending along a direction parallel to the third mobile arm 530, the third fixed arm 532 and the third abutment arm 533 being disposed on either side of the central portion 502;

Preferably, the first 510, the second 520 and the third 530 mobile arms are respectively configured to unwind the first 221a, the second 222a and the third 223a layer along respectively the first 231, the second 241 and the third 251 axis of extension from respectively the first 512, the second 522 and the third 532 fixed arm to the respectively first 513, second 523 and third 533 abutment arm so as to superpose at least one portion of respectively the first 221a, the second 222a and the third 223a layer with at least any one portion of the first 221a, second 222a and/or third 223a layers at the level of the central portion 502 of the frame 501.

Preferably, the mobile arms 510, 520, 530 rotate about the respective fixed 512, 522, 532 and abutment 513, 523, 533 arms thereof so as to unwind the respective coils 511, 521, 531 thereof by winding the respective layers 221a, 222a, 223a thereof around the respective fixed 512, 522, 532 and abutment 513, 523, 533 arms.

Thus, this machine 500 allows, at an industrial pace, the implementation of the method described above.

According to an embodiment not illustrated, the machine can comprise at least one fourth mobile arm in rotation about the axis of rotation of the wheel so as to partially form at least the rim by rotating around the disc thus formed.

Examples of Embodiments and Materials

As non-limiting examples, the following materials can be adapted to the different elements of the present invention:

The first layer 221a can comprise at least one of the following composite materials: Mass fibre or carbon fibre;

The second layer 222a can comprise at least one of the following composite materials: glass fibre or carbon fibre;

The third layer 223a can comprise at least one of the following composite materials: glass fibre or carbon fibre.

REFERENCES

100. Wheel
200. Disc
201. First disc
202. Second disc
203. Spacer
204. Junction plane
205. Securing zone
210. Central zone
211. Multidirectional stack
220. Peripheral zone
   221. First portion
      221a. First layer
   222. Second portion
      222a. Second layer
   223. Third portion
      223a. Third layer
      224a. Fourth layer
      225a. Fifth layer
      226a. Sixth layer
      227a. Seventh layer
      228a. Eighth layer
      229a. Ninth layer
230. First spoking axis
   231. First axis of extension
   232. First plurality of soaking axes
240. Second spoking axis
   241. Second axis of extension
   242. Second plurality of spoking axes
250. Third spoking axis
   251. Third axis of extension
   252. Third plurality of spoking axes
260. Peripheral portion
   261. Inclined portion
      261a. First inclined portion
      261b. Second inclined portion
   262. Curved portion
   263. Deformation zone
   264. Additional deformation zone
270. Extension
300. Hub support
   310. Axis of rotation of the wheel
   320. Chassis
400. Rim
   401. First portion of the rim
   402. Second portion of the rim
   410. Bottom of the rim
   420. Flange of the rim
   430. Edge of the rim
      431. First edge of the rim
      432. Second edge of the rim
500. Machine
   501. Frame
   502. Central portion
   503. Peripheral portion
   510. First mobile arm
      511. First coil
      512. First fixed arm
      513. First abutment arm
      514. First support part
   520. Second mobile arm
      521. Second coil
      522. Second fixed arm
      523. Second abutment arm
      524. Second support part
   530. Third mobile arm
      531. Third coil
      532. Third fixed arm
      533. Third abutment arm
      524. Third support part

The invention claimed is:

1. A device configured to form at least partially a disc of a wheel comprising a rim and at least one support of at least one hub defining an axis of rotation, the device comprising, at least:
   one central zone;
   one peripheral zone partially surrounding the central zone;
   one first portion comprising at least one first layer of at least one first composite material formed by a first one-directional fibre bundle in an array and extending into the peripheral zone and into the central zone along a first axis of extension parallel to a main direction extension of the fibres of the first one-directional bundle;
   one second portion comprising at least one second layer of at least one second composite material formed by a second one-directional fibre bundle in an array and extending into the peripheral zone and into the central zone along a second axis of extension parallel to a main direction of extension of the fibres of the second one-directional bundle, the second axis of extension being different from the first axis of extension; and
   at least one third portion comprising at least one third layer of at least one third composite material formed by a third one-directional fibre bundle in an array and extending into the peripheral zone and into the central zone along a third axis of extension parallel to a main direction of extension of the fibres of the third one-directional bundle, the third axis of extension being different from the first axis of extension and of the second axis of extension,
   and wherein the first portion, the second portion, and the at least one third portion are superposed relative to one another at the level of the central zone defining a multidirectional stack of one-directional bundles, within which portions of the first layer, portions of the second layer, and portions of the third layer are superposed alternately.

2. The device according to claim 1, wherein the multidirectional stack comprises at least one multidirectional reinforcement disposed between at least the first layer and the second layer.

3. The device according to claim 1, wherein the first axis of extension and the second axis of extension are orthogonal to the axis of rotation of the wheel.

4. The device according to claim 1, wherein the peripheral zone comprises at least one peripheral portion configured to form at least partially one portion of the rim comprising at least one from among: a portion of the bottom of the rim, one portion of at least one flange of the rim, one portion of at least one edge of the rim.

5. The device according to claim 1, wherein a portion of the first layer and/or of the second layer at the level of the peripheral zone is inclined and/or curved relative to a plane comprising the first and the second axes of extension.

* * * * *